(12) United States Patent
Miller et al.

(10) Patent No.: US 11,600,849 B2
(45) Date of Patent: Mar. 7, 2023

(54) RELEASE LAYER FOR PREPARATION OF ION-CONDUCTING MEMBRANES

(71) Applicant: International Business Machines Corporation, Armonk, NY (US)

(72) Inventors: Robert D. Miller, San Jose, CA (US); Young-Hye Na, San Jose, CA (US); Sogol Teschler, San Jose, CA (US); Khanh Nguyen, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 17/131,226

(22) Filed: Dec. 22, 2020

(65) Prior Publication Data
US 2021/0111462 A1  Apr. 15, 2021

Related U.S. Application Data

(62) Division of application No. 15/960,328, filed on Apr. 23, 2018, now Pat. No. 10,971,708.

(51) Int. Cl.
*H01M 50/403* (2021.01)
*H01M 10/0525* (2010.01)
(Continued)

(52) U.S. Cl.
CPC ......... *H01M 10/0525* (2013.01); *B29C 39/36* (2013.01); *H01M 50/403* (2021.01);
(Continued)

(58) Field of Classification Search
CPC ................ B29C 39/36; B29K 2023/38; B29K 2079/08; B29L 2031/3468;
(Continued)

(56) References Cited

U.S. PATENT DOCUMENTS

| 4,183,988 A | 1/1980 | Farrington et al. |
| 8,367,231 B2 | 2/2013 | Reiche et al. |

(Continued)

FOREIGN PATENT DOCUMENTS

| CN | 107665966 A | 2/2018 |
| CN | 109004271 A | 12/2018 |

(Continued)

OTHER PUBLICATIONS

IBM: List of IBM Patents or Patent Applications Treated as Related, Dec. 22, 2020, pp. 1-2.
(Continued)

*Primary Examiner* — Lingwen R Zeng
(74) *Attorney, Agent, or Firm* — Karen Canaan; CanaanLaw, P.C.

(57) ABSTRACT

A method includes applying to a substrate a solution including a polymeric compound to form a release layer on the substrate; applying ion-conducting elements on the release layer; applying a matrix polymer on the release layer, wherein the matrix polymer surrounds at least some of the ion-conducting elements; and removing the release layer to separate the matrix polymer from the substrate such that the ion-conducting elements remain embedded in a carrier layer of the matrix polymer and form an ion-conducting membrane.

11 Claims, 15 Drawing Sheets

(51) Int. Cl.
*H01M 50/446* (2021.01)
*B29C 39/36* (2006.01)
*B29K 23/00* (2006.01)
*B29L 31/34* (2006.01)
*B29K 79/00* (2006.01)
*H01M 12/08* (2006.01)
*H01M 10/0562* (2010.01)

(52) U.S. Cl.
CPC ....... *H01M 50/446* (2021.01); *B29K 2023/38* (2013.01); *B29K 2079/08* (2013.01); *B29L 2031/3468* (2013.01); *H01M 10/0562* (2013.01); *H01M 12/08* (2013.01); *H01M 2300/0068* (2013.01); *H01M 2300/0071* (2013.01); *H01M 2300/0085* (2013.01); *Y02E 60/10* (2013.01)

(58) Field of Classification Search
CPC ......... H01M 10/0525; H01M 10/0562; H01M 12/08; H01M 2300/0068; H01M 2300/0071; H01M 2300/0085; H01M 50/403; H01M 50/446; Y02E 60/10
See application file for complete search history.

(56) References Cited

U.S. PATENT DOCUMENTS

| | | | |
|---|---|---|---|
| 9,181,085 B2 | 11/2015 | Yoon et al. | |
| 9,502,729 B2 | 11/2016 | Badding et al. | |
| 9,520,627 B2 | 12/2016 | Aetukuri et al. | |
| 10,090,501 B2 | 10/2018 | Hong et al. | |
| 10,446,821 B2 | 10/2019 | Hayashi et al. | |
| 2007/0066080 A1 | 3/2007 | Kugler et al. | |
| 2015/0079485 A1 | 3/2015 | Choi et al. | |
| 2016/0254560 A1* | 9/2016 | Aetukuri | C08J 5/22 429/408 |
| 2016/0276689 A1* | 9/2016 | Onomichi | H01M 8/1093 |
| 2017/0069933 A1 | 3/2017 | Morioka et al. | |
| 2018/0342765 A1 | 11/2018 | Mimura et al. | |
| 2019/0214622 A1 | 7/2019 | Choi et al. | |

FOREIGN PATENT DOCUMENTS

| | | |
|---|---|---|
| EP | 3671908 A1 | 6/2020 |
| KR | 101796749 B1 | 11/2017 |
| WO | 2016168715 A1 | 10/2016 |

OTHER PUBLICATIONS

Yan and Goedel, Polymer membranes with two-dimensionally arranged pores derived from monolayers of silica particles, Chemistry of Materials 16(9):1622-1626 (2004).

Hammerschmidt et al., Inkjet Printing of Reinforcing Patterns for the Mechanical Stabilization of Fragile Polymeric Microsieves, Langmuir 28(6):3316-3321 (2012).

Kiesow et al., Bicontinuous zeolite polymer composite membranes prepared via float casting, Journal of the American Chemical Society 135(11):4380-4388 (2013).

* cited by examiner

RELEASE LAYER FOR PREPARATION OF ION-CONDUCTING MEMBRANES

BACKGROUND

Energy storage devices including a high specific capacity and a high specific energy may provide a compact, rechargeable energy source suitable for use in portable electronics, electric transportation, or renewable energy storage. The need for high specific capacities and specific energies has led to the study of various metal-element batteries such as lithium-sulfur, metal-oxygen, lithium-oxygen, and the like. Batteries made with lithium-oxygen, lithium-air, and lithium with other gas mixtures containing oxygen are particularly attractive due to the low atomic number and density and high reducing capability of elemental lithium, and a lithium oxygen battery could potentially have a theoretical specific energy three to five times greater than conventional lithium-ion batteries.

SUMMARY

In some examples, an ion-conducting membrane, such as a lithium ion-conducting membrane (LICM), may be used in an energy storage device. In some such examples, the LICM may enable multiple electrolytes to be used within the energy storage device, protect an anode and/or a cathode of the energy storage device, provide a barrier to water and reactive gases, conduct lithium ions, or combinations thereof. LICMs may provide properties of both inorganic ion-conductive materials and organic polymers, such as, for example, good thermal stability, good ion conductivity, processability, flexibility, fracture and impact toughness, or the like. In some examples, a LICM includes ion-conducting elements surrounded by a matrix polymer. The ion-conducting elements allow the flow of ions, and the matrix polymer adheres to the ion-conducting elements to form the LICM. An example LICM is described in US Patent Application Publication No. 2015/0255767, which is incorporated herein by reference.

In some examples, a LICM may be formed using an adhesive tape method in which ion-conducting elements are deposited on an adhesive tape, such as a tape including an ethanol-soluble adhesive material. After depositing the ion-conducting elements on the adhesive tape, the matrix polymer may be coated onto the ion-conducting elements and adhesive tape to form a continuous layer of the matrix polymer at least around the ion-conducting elements. Any overburden of the matrix polymer on a top surface of the ion-conducting elements could be removed, such as via an etching process. The ion-conducting elements surrounded by the matrix polymer can then be separated from the adhesive tape to form the LICM. In some examples, the adhesive tape is dissolved to detach the LICM from the adhesive tape. For example, an adhesive tape including an ethanol-soluble adhesive material may be dissolved in ethanol to separate the LICM from the adhesive tape.

This disclosure describes example techniques, systems, and articles for forming an ion-conducting membrane such as, for example, a LICM. In some examples, the ion conducting membranes described herein may be used in an energy storage device such as a battery. The techniques, systems, and articles described herein provide an ion conducting membrane that is relatively impermeable to water and gases such as oxygen and $CO_2$, resistant to common organic electrolyte solvents, has good mechanical strength and good ion conductivity, is relatively insensitive to heat and other operating conditions, and may be used in a wider range of processes.

In one aspect, the present disclosure is directed to a method including applying to a substrate a solution including a polymeric compound to form a release layer on the substrate; applying ion-conducting elements on the release layer; applying a matrix polymer on the release layer, wherein the matrix polymer surrounds at least some of the ion-conducting elements; and removing the release layer to separate the matrix polymer from the substrate such that the ion-conducting elements remain embedded in a carrier layer of the matrix polymer and form an ion-conducting membrane.

in another aspect, the present disclosure is directed to an article including: a substrate; a release layer on the substrate, wherein the release layer includes a polymeric compound selected from the group consisting of poly(dimethylglutarimide) (PMGI), poly(acrylic acid) (PAA), poly(methacrylic acid) (PMAA), poly(vinyl alcohol) (PVA), poly(vinyl acetate) (PVAc), or poly(ethylene amine) (PEI), and combinations thereof; a. plurality of ion-conducting elements embedded in the release layer, wherein a first surface of at least a portion of the ion-conducting elements extends above the release layer; and a matrix polymer on the release layer, wherein the matrix polymer surrounds at least a portion of the ion-conducting elements, and wherein the matrix polymer is selected from the group consisting of a ring opening metathesis polymer (ROMP), a hydrogenated cyclo-olefin polymer (COP), a cyclo-olefin copolymer (COC), and combinations thereof.

In another aspect, the present disclosure is directed to a method including: anchoring ion-conducting particles in a polymeric release layer, wherein the release layer contacts a substrate; at least partially curing the release layer; applying a polymeric matrix on the release layer and the ion-conducting particles; removing an overburden of the polymeric matrix sufficient to expose an upper surface of at least some of the ion conducting particles; and removing the release layer to: (i) expose a bottom surface of the ion-conducting particles opposite the upper surface thereof, and (ii) separate a ion-conducting membrane from the substrate, wherein the membrane comprises an arrangement of ion conducting particles embedded in a carrier layer of the polymeric matrix, and wherein the exposed upper and lower surfaces of the ion conducting particles represent at least 50% of the total particle surface area.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like symbols in the figures indicate like elements.

DETAILED DESCRIPTION

The disclosure describes techniques, systems, and articles for forming an improved ion-conducting membrane that can be used as, for example, an energy storage device such as a battery. In some embodiments, the techniques, systems, and articles described herein include the use of a release layer on a relatively rigid substrate to form an improved LICM. For example, the techniques, systems, and articles for forming a LICM described herein may be subject to less variability, may be more resilient to exposure to heat and other operating conditions, and may enable a greater variety of processing techniques to be used in comparison to an adhesive tape method as described above.

Figure 1:
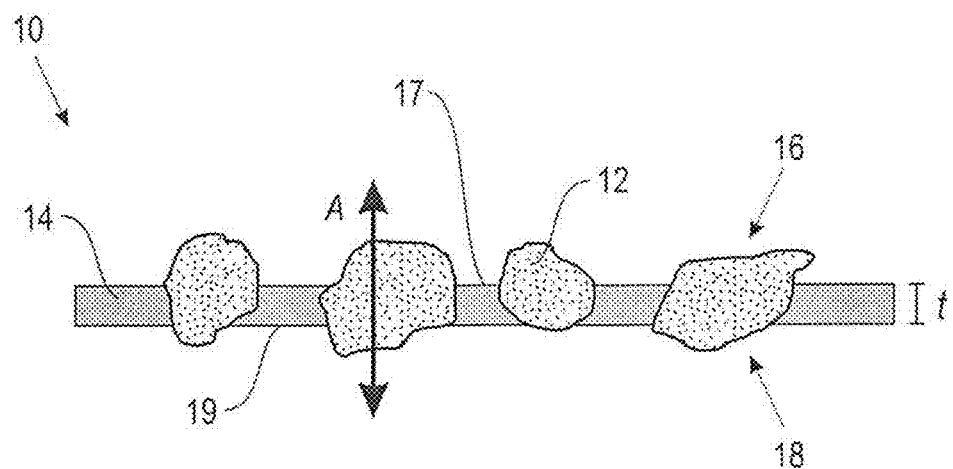
FIG. 1 is a conceptual diagram illustrating an example of a lithium ion-conducting membrane.

The adhesive tape method described above may present challenges to forming the LICM. For example, properties of the adhesive tape, such as dissolution and solubility properties, may change over time. In turn, the adhesive tape may be relatively difficult to dissolve or remove from the LICM in some cases. This may result in incomplete dissolution of the adhesive tape and/or residue formation on the LICM, which may affect the performance of the LICM, require additional process steps (e.g., to remove the residue), or the like. Additionally, or alternatively, the adhesive tape may be relatively sensitive to heat, For example, the adhesive tape may shrink, curl, or both, upon exposure to heat, which may put additional stress on or even tear the LICM. Moreover, the adhesive tape may be relatively flexible, limiting the techniques that can be used to remove any overburden of the matrix polymer on the ion-conducting elements. Techniques such as polishing may be difficult to use to remove the overburden due to buckling or wrinkling of the flexible adhesive tape, Although the disclosure primarily refers to lithium ion-conducting materials, a wide variety of ion-conducting materials may be used. For example, the techniques, systems, and articles described herein may be used with materials that conduct ions of Na, H K, Fe, Zn, Mg, Ca, or the like. Thus, in various embodiments, the ion-conducting membranes described herein may be a Na-ion conducting membrane, a conducting membrane, a K-ion conducting membrane, an Fe-ion conducting membrane, a Zn-ion conducting membrane, a Mg-ion conducting membrane, a Ca-ion conducting membrane, or any other ion-conducting membrane, FIG. 1 is a conceptual diagram illustrating a LICM 10. LICM 10 includes ion-conducting elements 12, at least a portion of which are surrounded a matrix polymer 14. Ion-conducting elements 12 may be made from a wide variety of materials, depending on, for example, which ions are to be conducted across LICM 10, the level of conductivity desired of LICM 10, or the like. In some embodiments, ion-conducting elements 12 for use in LICM 10 for a lithium ion or a lithium oxygen battery may include ceramic lithium ion conductors, such as polymer-ceramic composites, non-oxide inorganic materials, perovskite-type oxides, garnet-type oxides, $Li_3PO_4$ oxides, NASICON-type (Sodium Super Ionic Conductor) materials, LISICON-type (Lithium Ion Super Ionic Conductor) materials, single crystal membranes, or combinations thereof.

Examples of inorganic non-oxide materials for use as ion-conducting elements 12 may include polycrystalline LiI or LiI including $CaI_2$. In some examples, which are not intended to be limiting, the addition of ceramic materials such as $Al_2O_3$ may improve lithium ion conductivity of ion-conducting elements 12 including an inorganic non-oxide material.

Ion-conducting elements 12 may additionally, or alternatively, include solid-state lithium ion conductors such as, for example, Perovskite-type oxides such as $Li_{3x}La_{(2/3)-x}TiO_3$ (LLTO) with A-site vacancies. In some embodiments, the Perovskite-type oxides such as LLTO may exhibit a lithium ion conductivity of about $10^{-3}$ S/cm in single crystals, and some polycrystalline LLTOs may exhibit conductivities of greater than about $10^{-5}$ S/cm, The structure and synthesis of suitable compounds are described in S. Stramare et al,*Chem. Mater.* 2003, 15, 3974; K. Kitaoka et al., *J. Mater, Sci.* 1997, 32, 2063; Y. Inaguma et al., *J. Ceramic Soc. Int. Ed* 1997, 105, 597; and A. Varez et al, *J. Mater. Chem.* 2001 11,125.

In some embodiments, the ion-conducting elements 12 may include a garnet-like oxide ($Li_xLa_3M_2O_{12}$, Zr, Nb, Ta, Sb, Bi), which in some cases can be processed at lower temperatures, to reduce the loss of Li. In some cases, the addition of one or more compounds or dopants to the garnet-like oxide may increase the Li ion conductivity of the garnet-like oxide. For example, some garnet-like oxides including one or more additional compounds may exhibit a Li ion conductivity of about $10^{-4}$ S/cm to about $10^{-5}$ S/cm. The structure and synthesis of these compounds are discussed in *Solid State Ionics* 2009, 180(14-16), 911; Y. Shimonski et al., *Solid State Ionics* 2011, 183(1), 48; and Chem. Soc. Rev. 2014, 43(13):4714-27.

In some embodiments, such as those in which LICM 10 is to be used with a lithium-oxygen battery application using an aqueous electrolyte, the ion-conducting elements 12 may include a glassy ceramic membrane such as $LiM_2(PO_4)_3$, where M=Ge, Ti, Hf, or Zr. The glassy ceramic membrane may optionally be protected with a polyethylene oxide (PEO) laminate film to isolate and protect the inorganic material from the lithium metal anode.

In some embodiments, crystalline materials such as $Li_3N$ and $Li_{1/3-x}Li_{3x}NbO_3$ exhibit a relatively high conductivity (e.g., about $10^{-3}$ S/cm) and a highly isotropic conductivity, which may be suitable for use as ion-conducting elements 12. The conductivity of such materials may optionally be increased by including one or more additional materials such as, for example, glassy lithium sulfide including $Bi_2S_3$, $SiS_2$, $Li_3(PO_4)$, $Li_2S-SiS_2-Li(PO_4)_3$, which may exhibit a conductivity up to about $7 \times 10^{-4}$ S/cm.

As another example, ion-conducting elements 12 may include a NASICON, a sodium super ionic conductor, with a general formula of $NaM_2(PO_4)_3$; M=Ge, Ti, Hf, Zr. In some embodiments, substitution of at least some of the M sites with a trivalent ion (e.g., Al, Ga, Fe, La, or the like) may lead to increased incorporation of Li ions. In other embodiments, sintering may increase the density, which may improve the conductivity of polycrystalline NASICON materials. The structure and synthesis of these compounds are discussed in, for example, I.Y. Pinua et al., *Inorganic Mater.* 2009, 45(12), 1370 and A.G. Jolley et al., *Ionics.* 2015, 21(15), 3031.

In some embodiments, ion-conducting elements 12 may include single crystal Si membranes. However, the conductivity exhibited by such single crystal Si membranes may be less than that demonstrated by NASICON materials.

As still another example, ion-conducting elements 12 may include a class of lithium conductors called $Li^+$ super ionic conductors, LISICON, such as $Li_{2-2x}Zn_{1-x}Ge(O)_4$. LISICON materials may exhibit a conductivity greater than about $10^{-5}$ S/cm at room temperature, and may continue to exhibit a good conductivity at elevated temperatures (e.g., temperatures above room temperature)

In some embodiments, oxygen may be replaced by sulfur to form thio-LISICON (e.g., $Li_{3.25}Ge_{0.25}P_{0.75}S_4$, which in some cases, may improve ionic mobility. Thio-LiSICON materials may exhibit conductivities on the order of about $10^{-3}$ S/cm. Such materials, such as, for example, ceramic materials including $Li_7P_3S_{11}$, exhibit a conductivity of about $10^{-3}$ S/cm. As another example, a thio-LiSICON material with a composition of $Li_{10}GeP_2S_{12}$ may exhibit an ion conductivity of about $10^{-2}$ S/cm. The structure and synthesis of these compounds are discussed in, for example, Hong *Mater. Res. Bull.* 1978, 13, 117; P.G. Bruce et al., *J. Electrochem. Soc.* 1983, 130, 662; and A.D. Robertson et al., *Solid State Ionics* 1997, 12, 1.

In other embodiments, ion-conducting elements 12 may include one or more other materials in addition to, or as an alternative to, polymer-ceramic composites, non-oxide inorganic materials, perovskite-type oxides, garnet-type oxides, $Li_3PO_4$ oxides, NASICON-type (Sodium Super Ionic Conductor) materials, LISICON-type (Lithium-Ion Super Ionic Conductor) materials, or single crystal membranes. For example, ion-conducting elements 12 may include lithium aluminum titanium phosphate (LATP; $Li_{1+x}Al_xTi_{2-x}(PO_4)_3$), lithium aluminum germanium phosphate (LAGP; $Li_{1+x}Al_xGe_{2-x}(PO_4)_3$), and/or lithium aluminum tantalum titanium phosphate (LATTP; e.g., $Li_{1.6}Al_{0.5}Ti_{0.95}Ta_{0.5}(PO_4)$).

As shown in FIG. 1, ion-conducting elements 12 are arranged in a single layer to provide good ion conductivity and avoid impedance issues at contact interfaces between ion-conducting elements 12, such as an interface between ion-conducting elements 12 contacting or overlying each other. In other examples, however, at least some of ion-conducting elements 12 may contact or overlie one another.

Ion-conducting elements 12 may be any suitable size. In some examples, which are not intended to be limiting, an average largest dimension of ion-conducting elements 12, such as the average largest cross-sectional dimension of ion-conducting elements 12, may be between about 1 μm and about 100 μm, or between about 10 μm and about 80 μm, about 20 um and about 60 μm, or about 30 μm and about 50 μm.

In the embodiment of FIG. 1, ion-conducting elements 12 are irregular shapes, but the ion-conducting elements 12 may have any suitable shape. For example, ion-conducting elements 12 may have a regular, tile-like shape. Moreover, ion-conducting elements 12 may be arranged in any regular or irregular array within matrix polymer 14.

Regardless of the composition, size, or shape of ion-conducting elements 12, ion-conducting elements 12 may span the thickness I of matrix polymer 14 as shown in FIG. 1. In this way, ion-conducting elements 12 extend from a first major surface 17 of matrix polymer 14 to a second major surface 19 of matrix polymer 14, which allows ions to flow freely in the direction A between a first surface 16 of ion-conducting elements 12 to a second surface 18 of ion-conducting elements 12. In some examples, the exposed first surface 16 and the exposed opposing, second surface 18 of each ion-conducting element 12 may include at least about 50% of a surface area of the respective ion-conducting element 12. In other cases, the exposed first surface 16 and the exposed opposing, second surface 18 of each ion-conducting element 12 may include less than or greater than about 50% of the surface area of the respective ion-conducting element 12. In yet other examples, one or more ion-conducting elements 12 may not span the full thickness t of matrix polymer 14, but such a LICM 10 may have a lower conductivity than a LICM in which ion-conducting elements 12 span the full thickness I of matrix polymer 14.

Matrix polymer 14 surrounds and retains at least a portion of the ion-conducting elements 12. In some embodiments, the matrix polymer 14 absorbs little or no water, is impermeable to gases, such as $CO_2$ and oxygen, does not swell or swells relatively little in solvents employed in electrolyte mixtures (e.g., polar solvents), strongly adheres to ion-conducting elements 12, has good mechanical properties (e.g., modulus and toughness), is easily applied as a solution (e.g., by spin coating, dip coating, vapor phase deposition, spraying, or the like), or combinations thereof.

In some embodiments, the matrix polymer 14 may include a non-polar polymer with a glass transition temperature ($T_g$) greater than about 80° C., or greater than about 100° C. Moreover, in some cases, matrix polymer 14 may be an insulator, have a relatively low dielectric constant, have low Li reactivity, low ionic conductivity, or combinations thereof. In some examples, matrix polymer 14 that is an insulator may prevent dendrite formation during charging and discharging of an energy storage device including LICM 10.

In sonic embodiments, the matrix polymer 14 may be deposited as a solution. For example, matrix polymer 14 may include an addition polymer, a ring forming polymer (cyclization polymer), a ring opening metathesis polymer (ROMP), a hydrogenated cyclo-olefin polymer (COP), or a cyclo-olefin copolymer (COC). Suitable addition polymers are commercially available from TOPAS Corp., and examples of COP materials are commercially available from Zeon Corp., Japan, as either the Zeonor or Zeonex series.

Suitable matrix polymers 14 including a COP may have a $T_g$ greater than about 100° C., a $T_g$ greater than about 140° C., or a $T_g$ greater than about 170° C. The matrix polymer 14 may additionally or alternatively include olefin addition polymers and copolymers, ring opening metathesis polymers including reduced forms, acyclic diene metathesis polymers including reduced forms, fluorocarbon addition polymers, fluoroether polymers, cyclobutyl fluoroethers, polyarylenes and polyarylene ethers, polybenzoazoles, polysiloxanes, silsequioxanes, polycarbosilanes, and combinations thereof. The choice of material for matrix polymer 14 may depend on a desired dielectric constant and/or temperature endurance properties of matrix polymer 14. In some examples, matrix polymer 14 may be dissolved in a solvent to be deposited as a solution.

In some examples, matrix polymer 14 may be prepared by a Parylene process, a vapor deposition process for polymerization utilizing materials available from Parylene Engineering, Redmond, Wash. The Parylene process is a high temperature monomeric cracking process followed by reactive monomer polymerization that forms a poly-para-xylylene conformal coating film using chemical vapor deposition (CVD). The polymerization can take place at room temperature or below. In some examples, matrix polymer 14 may include at least one of Parylene C (a mono-chloro substituted compound), Parylene N (an un-substituted compound), Parylene D (a di-chloro-substituted compound), or AF4 (a fluorinated Parylene).

Additionally, or alternatively, matrix polymer 14 may include a thermoplastic polymer and/or a thermosetting polymer. As one example, matrix polymer 14 including a thermosetting polymer may include benzocyclobutene functionality, such as, for example, a. benzocyclobutene resin available under the trade designation CYCLOTENE from Dow Chemical, Midland, Mich.

Figure 2:
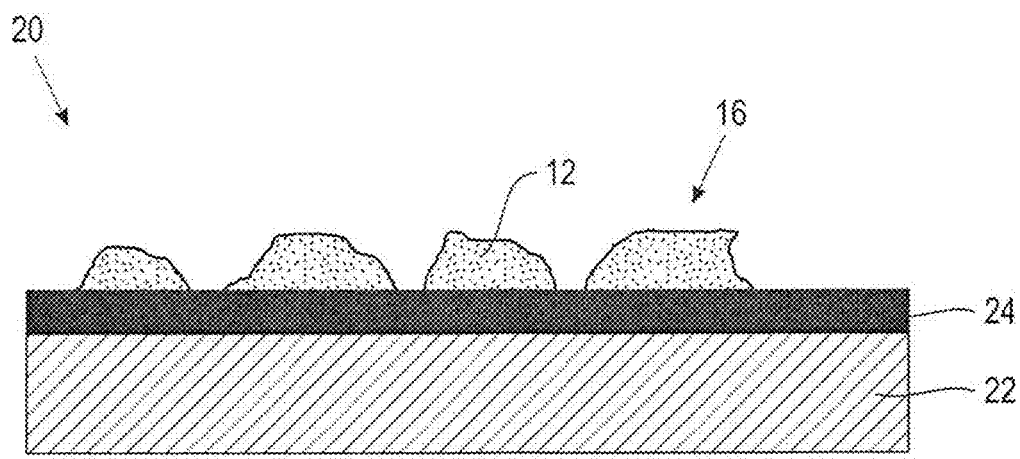
FIG. 2 is a conceptual diagram illustrating an example of an article for forming a lithium ion-conducting membrane.

FIG. 2 is a conceptual diagram illustrating an article 20 for forming LICM 10. Article 20 includes ion-conducting elements 12 embedded in a release layer 24 on a substrate 22. Substrate 22 may be any relatively rigid material on which release layer 24 can be formed. In various embodiments, the substrate 22 may include at least one of glass, quartz, silicon, nitride, or another inorganic material, or may include an organic material such as a polyester, a polyimide, a polyamide, and the like. However, a substrate made from an organic material should be thicker than a substrate made from an inorganic substrate material to provide sufficient rigidity to carry and support the release layer 24, the ion-conducting elements 12, and the matrix polymer 14 through a series of processing steps. For example, a relatively rigid substrate 22 may make possible subsequent polishing steps for the ion-conducting elements 12 carried in matrix polymer thereon, whereas a less rigid substrate may bend and deform during polishing steps.

Release layer 24 is configured to adhere to ion-conducting elements 12 to hold ion-conducting elements 12 in place while forming LICM 10. In some embodiments, the release layer 24 may be a solution and/or release layer 24 may be dissolved in a solvent to form a solution. The release layer 24 may include a material that will not diffuse into or dissolve upon contact with matrix polymer 14 and/or a solvent used for coating matrix polymer 14 to form LICM 10. For example, release layer 24 may be a polar material, whereas matrix polymer 14 and/or the solvent used to coat matrix polymer 14 may be a non-polar material. In this way, release layer 24 may not diffuse and/or dissolve due to matrix polymer 14 or the solvent used to deposit matrix polymer 14. Additionally, or alternatively, release layer 24 may exhibit a glass transition temperature ($T_g$) greater than about 100° C., such that release layer 24 is relatively insensitive to various operating conditions and temperatures.

In some examples, which are not intended to be limiting, the release layer 24 may include a polymeric compound chosen from poly(dimethylglutarimide) (PMGI), poly (acrylic acid) (PAA), poly(methacrylic acid) (PMAA), poly (vinyl alcohol) (PVA), poly(vinyl acetate) (PVAc), polyethylene: amine) (PEI), and combinations thereof. The release layer 24 may additionally or alternatively include one or more other materials such as, for example, one or more different high molecular weight polymers configured to dissolve in a polar material and/or chemically react with an aqueous solution, such as an acidic or a basic solution.

In some embodiments, the polymeric compounds in the release layer 24 may be dissolved in a solvent and applied on substrate 22 as a solution, and the solution may then be partially or fully cured to form the release layer 24. In some embodiments, the as-applied release layer may include some solvent, and in some embodiments the cured or partially cured release layer 24 may have tack. For example, the polymeric compounds used to form the release layer 24 may be dissolved in a solvent that has a high boiling point, or may be dissolved in a mixture of solvents, at least one of which has a relatively high boiling point. In this way, at least some of the at least one solvent having a high boiling point may remain in release layer 24 after application on substrate 22, which may result in a tacky release layer construction. In examples in which a mixture of solvents is used to dissolve the polymeric compounds in the release layer 24, the polymeric compounds may be soluble in all the solvents of the mixture to prevent precipitation and/or selective solvent removal.

Additionally, or alternatively, one or more optional additives may be added to the solution used to form the release layer 24 to alter a property of release layer 24. In one example, an additive including anhydrous N-methylpyrrolidinone (NMP) may be added to the solution such that release layer 24 remains tacky after being applied to substrate 22.

The solvent selected for use in the solution to form the release layer 24 may vary widely depending on the polymeric compounds in the release layer 24. As one example, which is not intended to be limiting, a solution intended to form the release layer 24 including PMGI may be dissolved in a solvent including cyclopentanone, cyclohexanone, dimethylformamide (DMF), N-methyl-2-pyrrolidone (NMF), or the like. As another non-limiting example, a solution used to form a release layer 24 including PVA, PVAc, PAA, or PMAA may be dissolved in a. solvent including water.

The cured or partially cured release layer 24 may be removed to separate LICM 10 from substrate 22. In some embodiments, the release layer 24 may include a material selected to chemically react with and/or dissolve at a specific interface (e.g., an interface between ion-conducting elements 12 or matrix polymer 14 and release layer 24). In this way, the technique of forming LICM 10 including release layer 24 as described herein may be less likely to leave a. residue on ion-conducting elements 12 or matrix polymer 14 of LICM 10 than some other techniques, such as an adhesive tape method. For example, in the adhesive tape method, formation of LICM 10 is due to overall dissolution of both an adhesive material and a substrate material (e.g., the adhesive tape) rather than a chemical reaction or interfacial dissolution of the adhesive material alone. Additionally, or alternatively, the application of the release layer 24 may enable substrate 22 to be reused, rather than the substrate 22 itself being dissolved as in some other techniques (e.g., the adhesive tape method). For example, the release layer 24 may include an acidic material that chemically reacts with a basic material to be removed, or it may include a basic material that chemically reacts with an acidic material to be removed, and substrate 22 may not react with the respective basic or acidic material. As one example, a release layer 24 including a polymeric compound such as PMGI may be dissolved in tetramethyl ammonium hydroxide (TMAH) in methanol or TMAH in water.

In other embodiments, the release layer 24 may be configured to dissolve at a specific interface (e.g., an interface between ion-conducting elements 12 or matrix polymer 14 and release layer 24) to be removed. In some cases, the interfacial dissolution of release layer 24 at a specific interface may result in a more complete dissolution and reduced residue formation on ion-conducting elements 12 or matrix polymer 14 in comparison to some other techniques. As one example, the release layer 24 may dissolve in a polar material (e.g., water) in which matrix polymer 14 and ion-conducting elements 12 are insoluble.

As another example, the release layer 24 may be removed to separate LICM 10 from substrate 22 by a thermal or a photochemical treatment. Removal of the release layer 24 by a thermal or a photochemical treatment may enable substrate 22 to be reused. Examples of materials for release layer 24 that can be removed via a thermal or a photochemical treatment are available from Nitto Denko, Japan.

Figure 3:
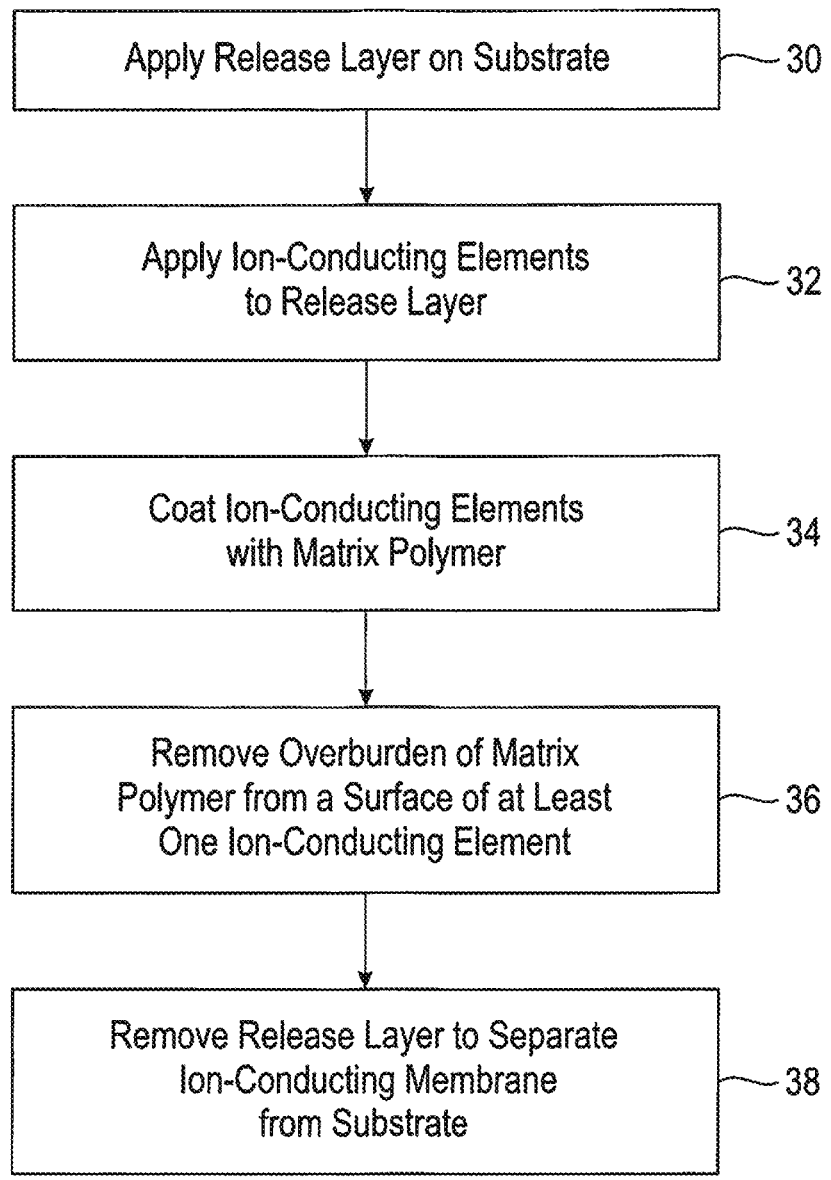
FIG. 3 is a flow diagram illustrating an example of a technique for forming a lithium ion-conducting membrane.

FIG. 3 is a flow diagram illustrating a technique for forming the LICM 10 of FIG. 1. FIGS. 4A-4F are conceptual diagrams illustrating stages of the technique of FIG. 3 for forming LICM 10. The technique of FIG. 3 will be described with respect to the stages illustrated in FIGS. 4A-4F for ease of description only; in other examples, other stages may be used with the technique of FIG. 3.

Figure 4A:
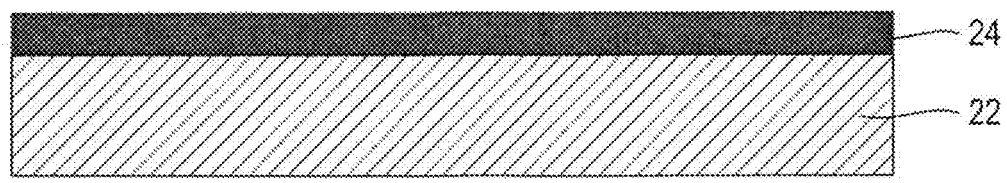
FIGS. 4A-4F are conceptual diagrams illustrating stages of the example of a technique of FIG. 3 for forming a lithium ion-conducting membrane.

The technique of FIG. 3 includes applying a release layer 24 on a substrate 22 (30), In some embodiments, the release layer 24 is applied as a solution, and the technique of FIG. 3 may include dissolving a polymeric compound in a solvent to form a solution prior to applying release layer 24 on substrate 22. The release layer 24 may be applied on substrate 22 using any suitable technique such as spin coating, slot coating, doctor Wading, dip coating, spraying, vapor phase deposition and the like. FIG. 4A shows the as-applied release layer 24 on substrate 22.

The release layer 24 may be applied on substrate 22 (30) in any suitable thickness (e.g., as measured in a direction normal to a surface of substrate 22 on which release layer 24 is applied). In some embodiments, release layer 24 may be greater than about 1 µm thick. Release layers 24 less that about 1 µm thick may not be able to retain embedded ion-conducting particles. In some cases, release layer 24 may be less than about 10 µm thick, or between about 7 µm and about 10 µm thick. In other examples, release layer 24 may be greater than 10 µm thick, although a thicker release layer 24 may take longer to remove than a thinner release layer 24.

Figure 4B:
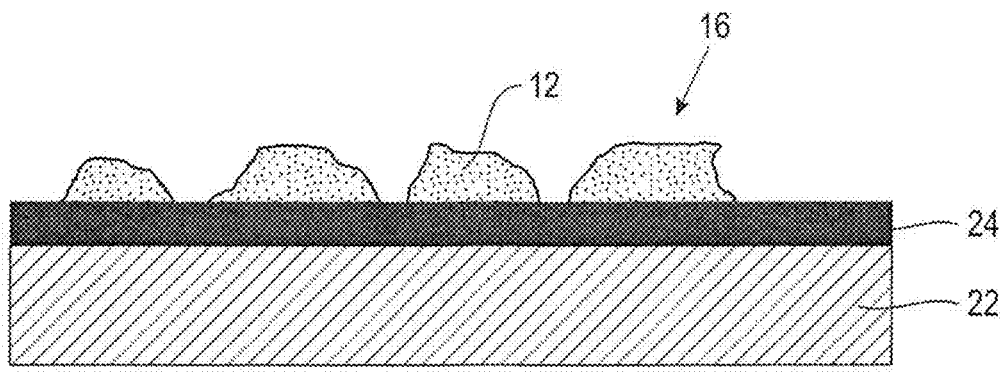

The technique of FIG. 3 also includes embedding ion-conducting elements 12 in release layer 24 (32). Embedding ion-conducting elements 12 in release layer 24 (32) may include depositing ion-conducting elements 12 on release layer 24. In some examples, the release layer 24 as-applied may be tacky such that ion-conducting elements 12 adhere to an exposed surface of the release layer 24. In some examples, at least a portion of the ion-conducting elements 12 may optionally be pressed into the release layer 24. For example, mild pressure could be applied with a flexible roller to firmly anchor ion-conducting elements 12 in release layer 24. As shown in FIG. 4B, in some embodiments, the ion-conducting elements 12 are embedded in release layer 24 such that at least first surface 16 of ion-conducting elements 12 is exposed (e.g., not embedded in release layer 24).

In some cases, at least some ion-conducting elements 12 may be removed such that ion-conducting elements 12 form a single layer embedded in release layer 24. A single layer of ion-conducting elements 12 may be a better conductor than multiple layers of ion-conducting elements 12 because multiple layers may have a higher impedance pathway. Interparticle pathways between two contacting or overlying ion-conducting elements 12 may have a higher impedance than a pathway that is not between two contacting or overlying ion-conducting elements 12. Excess ion-conducting elements 12 (e.g., those contacting or overlying another ion-conducting element 12) may be manually removed, shaken off, removed using air pressure, or the like. For example, embedding ion-conducting elements 12 in release layer 24 may allow substrate 22 including release layer 24 and ion-conducting elements 12 embedded in release layer to be shaken, e.g., using a shaker table, to dislodge and remove any ion-conducting elements 12 not firmly embedded in release layer 24 or any ion-conducting elements 12 overlying another ion-conducting element 12. This technique can increase the conductivity of LICM 10, and any ion-conducting elements 12 removed can be recovered and reused. In other examples, however, at least some of ion-conducting elements 12 may contact or overlie one another.

In some examples, the release layer 24 embedded with ion-conducting elements 12 may be heated to desolva.te (e.g., remove a solvent from) release layer 24. example, the polymeric compounds used to form the release layer 24 may have been dissolved in a solvent to be applied on substrate 22, and the release layer 24 embedded with ion-conducting elements 12 may be heated at a temperature less than the $T_g$ of the polymeric compounds in the solution. For example, a release layer 24 formed from a solution including PMGI (with a $T_g$ of about 195° C.) may be heated at a temperature of about 180° C. for about 10 minutes to desolvate release layer 24. In turn, ion-conducting elements 12 embedded in release layer 24 that has been desolvated may be more firmly anchored in release layer 24 in comparison to a release layer including residual solvent. In some embodiments, ion-conducting elements 12 embedded in release layer 24 may be heated after removing one or more ion-conducting elements 12. In other embodiments, ion-conducting elements 12 embedded in release layer 24 may be heated prior to removing one or more ion-conducting elements 12. In yet another example, release layer 24 may not be heated or desolvated, or one or more ion-conducting elements 12 may not be removed. Heating and desolvating release layer 24 may reduce the thickness of release layer 24. As one non-limiting example, after heating and desolvation, release layer 24 may be between about 3 µm and about 10 µm thick.

Release layer 24 may be cured in addition to, or as alterative to, desolvation. For example, release layer 24 may be heated to crosslink release layer 24 to more firmly anchor ion-conducting elements 12 in release layer 24.

Figure 4C:
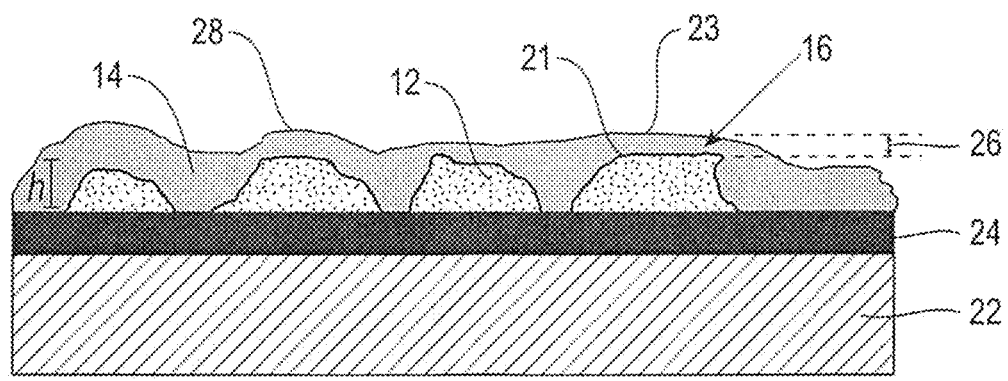

The technique of FIG. 3 further includes applying on the ion-conducting elements 12 a matrix polymer 14 (34). As shown in FIG. 4C, the matrix polymer 14 (34) may be applied over both the ion-conducting elements 12 and the release layer 24 such that matrix polymer 14 surrounds and embeds at least a portion of the ion-conducting elements 12. The matrix polymer 14 (34) may be deposited as a solution (e.g., spin coating, dip coating, slot coating, or the like), or deposited using a vapor deposition technique (e.g., a Parylene process).

In some embodiments, the applied matrix polymer 14 may conform to the shape defined by ion-conducting elements 12 and release layer 24. For example, matrix polymer 14 may have a contoured top surface 2.8 that generally follows the shape of the underlying ion-conducting elements 12 and release layer 24, rather than having a planar surface or only being deposited between ion-conducting elements 12. In this way, matrix polymer 14 may form an overburden 26 over first surface 16 of one or more ion-conducting elements 12. As shown in the example of FIG. 4C, all the ion-conducting elements 12 are coated with overburden 26 of matrix polymer 14 on first surface 16. In other examples, one or more ion-conducting elements 12 may not have overburden 26, such that first surface 16 of the one or more ion-conducting elements 12 remains exposed (e.g., not covered by matrix polymer 14).

In some embodiments in which at least one of ion-conducting polymers 12 is coated with overburden 26, the technique of FIG. 3 may further optionally include removing overburden 26 of matrix polymer 14 from at least one ion-conducting element 12 (36). Matrix polymer 14 may be an insulator, which may reduce the conductivity of LICM 10 if left as overburden 26 on one or more ion-conducting elements 12. Thus, removing overburden 26 of matrix polymer 14 from at least one ion-conducting element 12 (36) enhances the conductivity of the LICM 10 relative to a LICM including at least some ion-conducting elements 12 underlying the overburden 26. Of course, if few or none of ion-conducting elements 12 include overburden 26 after coating ion-conducting elements 12 with matrix polymer 14, removing overburden 26 may not be required.

In some embodiments, the overburden 26 of matrix polymer 14 may be removed by polishing to expose first surface 16 of at least one ion-conducting element 12. A relatively rigid substrate 22 may be less likely to wrinkle, buckle, or the like during polishing than some substrates that are more flexible, such as an adhesive tape. The polishing agent may include more than one grit particle size, such as grit particle sizes ranging from about 0.1 µm to about 6 µm, and the grit particle sizes may be used in an order of decreasing grit particle sizes.

The polishing step to remove overburden 26 of matrix polymer 14 from at least one ion-conducting element 12 (36) may planarize the surfaces 16 of at least some of the ion-conducting elements 12, or may in some cases remove a portion of first surface 16. In some embodiments, relatively planar first surfaces 16 of ion-conducting elements 12 may enhance contact between the LICM 10 and an electrode, e.g., in a battery, which may improve the function of LICM 10.

In some embodiments, one or more ion-conducting elements 12 may have sizes and/or shapes different from at least one other ion-conducting element 12, or ion-conducting elements 12 may not be oriented such that all of ion-conducting elements 12 are the same height h as measured from an interface between a portion of ion-conducting element 12 embedded in release layer 24 and a portion of ion-conducting element 12 that is not embedded in release layer to first surface 16 of ion-conducting element 12). Polishing to remove overburden 26 may result in some taller ion-conducting elements 12 having a relatively planar first surface 16, while sonic shorter ion-conducting elements 12 remain unpolished. For example, polishing the shorter ion-conducting elements 12 may extensively overpolish some of the taller ion-conducting elements 12, and even remove more of matrix polymer 14 surrounding ion-conducting elements 12, which can reduce the mechanical strength of the LICM 10. Thus, to preserve the mechanical strength of the LICM 10, polishing may cease before the overburden 26 is removed from the shorter ion-conducting elements 12. In such cases, the shorter ion-conducting elements 12 may not have a relatively planar first surface 16, may still include overburden 26, or both, after polishing.

In some embodiments, removing overburden 26 of matrix polymer 14 from at least one ion-conducting element 12 (36) may include a combination of polishing and etching. If polishing did not remove overburden 26 from one or more ion-conducting elements 12, such as some shorter ion-conducting elements 12, etching may be used to remove the remaining overburden 26. The combination of polishing and etching to remove overburden 26 from first surface 16 of ion-conducting elements 12 may result in at least some of ion-conducting elements 12 having a relatively planar first surface (e.g., some taller ion-conducting elements 12), while allowing first surface 16 of the shorter ion-conducting elements 12 to be exposed. Additionally, or alternatively, a combination of polishing and etching to remove overburden 26 may prevent too much of matrix polymer 14 surrounding ion-conducting elements 12 being removed, which could reduce the mechanical strength of LICM 10.

In other embodiments, the overburden 26 of matrix polymer 14 may be removed from the ion-conducting elements 12 (36) by etching alone. For example, plasma etching may be used to remove overburden 26 to expose first surface 16 of at least one ion-conducting element 12 without first polishing to remove overburden 26 from at least one other ion-conducting element 12. The time required to remove overburden 26 from at least some of ion-conducting elements 12 depends on the thickness of overburden 26 on first surface 16. In some examples, removing overburden 26 of matrix polymer 14 from at least one ion-conducting element 12 (36) by etching may be more efficient and/or require less processing steps than some other techniques used to remove overburden 26. The etching may remove overburden 26 without removing matrix polymer 14 surrounding (e.g., between) ion-conducting elements 12. For example, etching may be faster on first surface 16 where overburden 26 is located, overburden 26 may be thinner than the thickness of matrix polymer 14 surrounding ion-conducting elements 12, or both.

Figure 4D:
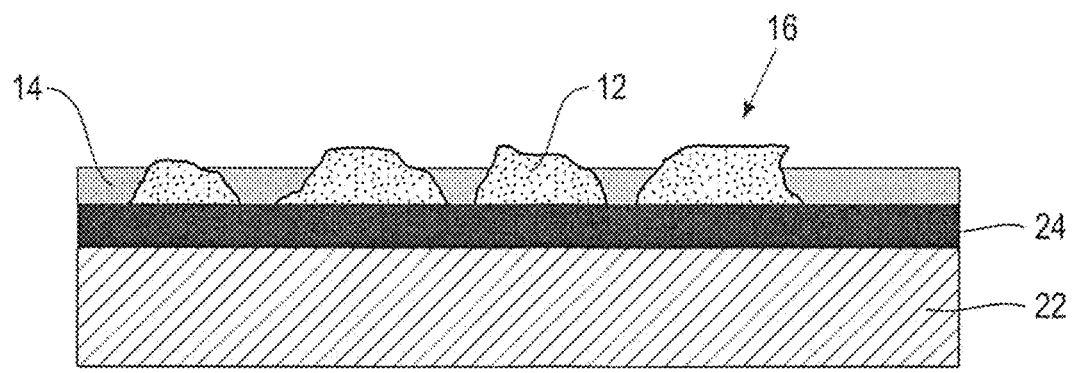

FIG. 4D shows an example article in which the overburden 26 has been removed from first surface 16 of ion-conducting elements 12. In some examples, overburden 26 is removed so first surface 16 of each ion-conducting element 12 is exposed, while matrix polymer 14 remains between ion-conducting elements 12 such that ion-conducting elements 12 are like islands surrounded by matrix polymer 14. in other examples, one or more ion-conducting elements 12 may still include overburden 26 after the removing step, or the technique of FIG. 3 may not include the removing step. If overburden 26 is not removed from one or more ion-conducting elements 12, the LICM 10 may have reduced conductivity compared to a LICM 10 in which all or most of ion-conducting elements 12 do not include overburden 26.

The technique of FIG. 3 further includes removing the release layer 24 to separate the matrix polymer and the ion-conducting elements retained and carried therein from substrate 22 (38). As described above, removing release layer 24 may include a chemical reaction between release layer 24 and a solution to chemically dissolve release layer 24, dissolution of release layer 24 at an interface between release layer 24 and ion-conducting elements 12 and/or between release layer 24 and matrix polymer 14, thermal treatment, and/or photochemical treatment. For example, release layer 24 may include an acid that chemically reacts to dissolve in a basic solution, may include a base that chemically reacts to dissolve in an acidic solution, or may be a polar compound dissolved in water. In any case, the removal of release layer 24 does not dissolve or affect the properties of matrix polymer 14 and/or ion-conducting elements 12. For example, matrix polymer 14 may be non-polar, and therefore insoluble in the water that may be used to dissolve release layer 24. The chemical reaction and/or interfacial dissolution may prevent residue from release layer 24) from being left on second major surface 19 of matrix polymer 14 or second surface 18 of ion-conducting elements 12 after separating LICM 10 from substrate 22. In one embodiment, which is not intended to be limiting. the release layer 24 including PMGI may be dissolved in TMAH in methanol or TMAH in water.

Figure 4E:
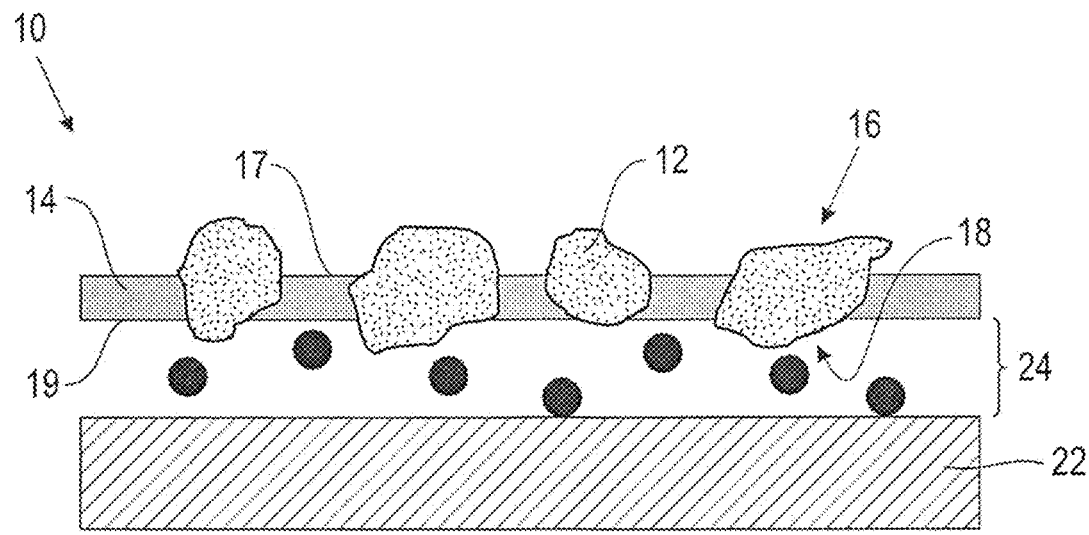

FIG. 4E shows a schematic diagram of release layer 24 being removed such that the matrix polymer 14 forms a carrier layer with embedded ion-conducting particles. The carrier layer of the matrix polymer 14 has sufficient dimensional stability to be separated from substrate 22 and retain the ion-conducting particles 12 to form a LICM such as the example construction shown in FIG. 1. Removing release layer 24 to separate the matrix polymer 14 and embedded particles 12 from the substrate 22 (38) may include immersing release layer 24 in a solution, spraying release layer 24 with the solution, exposing release layer 24 to the solution in combination with ultrasound energy, or the like to dissolve release layer 24. In other examples, a different technique, such as thermal treatment or photochemical treatment, may be used to remove release layer 24 to separate the matrix polymer from substrate 22 and form a dimensionally stable LICM construction.

Figure 4F:
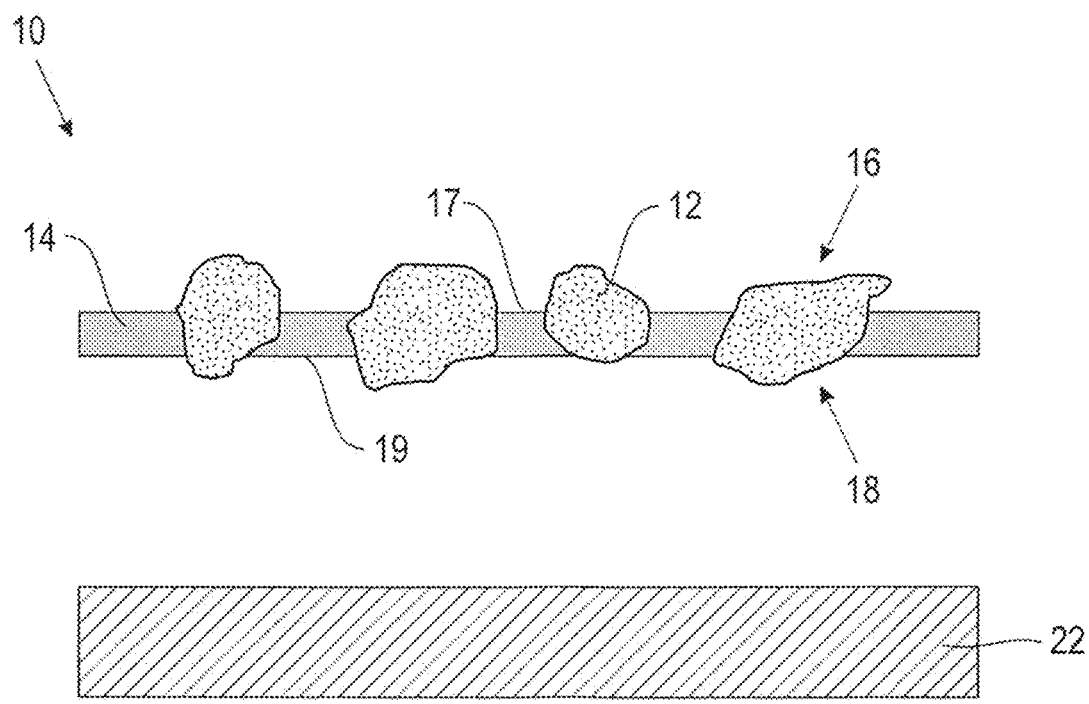

FIG. 4F shows the carrier layer of the matrix polymer 14 and embedded ion-conducting particles 12 separated from substrate 22 to form a LICM such as the device exemplified in FIG. 1. The technique of FIG. 3 does not dissolve substrate 22 with release layer 24, and thus the technique of FIG. 3 may make possible the re-use of the substrate 22 to, for example, form other LICMs or as a component in a subsequent process step.

The methods and constructions of the present disclosure will now be described with respect to the following non-limiting examples.

EXAMPLE 1

Applying Release Layer on Substrate

Solutions of poly(dimethylglutarimide) (PMGI) were obtained from Micro Chem Inc., Westborough, Mass., for use as release layer 24. The PMGI was dissolved in a solvent which was largely cyciopentanone purchased from Microchem Inc., Westborough, Mass., and designated as SP-13.Anhydrous N-methylpyrrolidinone NMP) was added to the PMGI solution to produce a solution that was about 10 wt. % NMP. Release layer 24 was spin coated as a solution on a silicon wafer substrate 22 at about 1500 rotations per minute (RPM). The silicon wafer substrate 22 had a diameter of about 2.5 cm (about 1 inch), and was relatively rigid. Release layer 24 on substrate 22 was between about 7 μm and about 10 μm thick and was tacky. Release layer 24 was not heated after application on substrate 22 to prevent drying by desolvation, e.g., so that release layer 24 would remain tacky.

EXAMPLE 2

Embedding Ion-Conducting Elements In Release Layer

Ion-conducting elements 12 including lithium ion-conducting solid particles were obtained from a variety of suppliers. Ion-conducting elements 12 included Lithium-Ion-conducting Glass-Ceramics (LICGC™) Powder available from Ohara Corp., Branchburg, N.J., lithium aluminum titanium phosphate (LATP) available from Schott Glass, Elmsford, N.Y., and lithium aluminum germanium phosphate (LAGP) available from MSE Supplies LLC, Tucson, Ariz. The size of ion-conducting elements 12 ranged from about 53 μm to about 65 μm. Ion-conducting elements 12 were deposited on release layer 24. Since release layer 24 was tacky, at least some of ion-conducting elements 12 stuck to and became anchored in release layer 24. :Ion-conducting elements 12 that were not anchored in release layer 24 were removed by shaking to form a single layer of ion-conducting elements 12 embedded in release layer 24.

Ion-conducting elements 12 embedded in release layer 24 and release layer 24 were heated to about 180° C. for about 10 minutes to desolvate release layer 24 and firmly anchor ion-conducting elements 12 therein. The thickness of release layer 24 after desolvation ranged from about 3 μm to about 5 μm.

Figure 5:
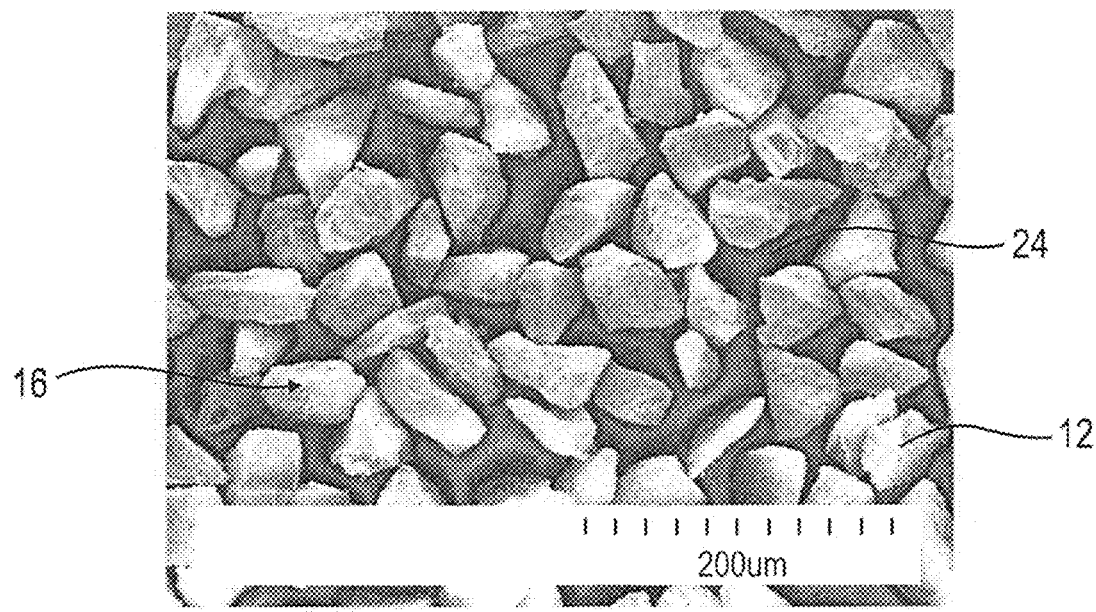
FIG. 5 is a top view of ion-conducting elements embedded in a release layer.

FIG. 5 is a top view image of ion-conducting elements 12 embedded in release layer 24. As seen in FIG. 5, first surface 16 of ion-conducting elements 12 remained exposed after embedding ion-conducting elements 12 in release layer 24.

EXAMPLE 3

Coating Ion-Conducting Elements with Matrix Polymer

Matrix polymers 14 studied were low dielectric constant, non-polar polymers derived from substituted norbomenes. Matrix polymers 14 were formed by either addition copolymerization or metathesis copolymerization followed by hydrogenation. The addition matrix polymers 14 were obtained from TOPAS Corp., Germany, and the hydrogenated cyclo-olefin (COP) metathesis matrix polymers 14 were obtained from ZEON Corp., Japan, and derived from either the ZENOR or ZEONEX product lines. The COP matrix polymers 14 had $T_g$s ranging from about 100° C. to greater than about 170° C.

In one example, a solvent including a cis/trans mixture of decalin available from Sigma-Aldrich, St, Louis, Mo., was used to dissolve a ZEON 1430 matrix polymer 14 to form a. solution which could be coated on ion-conducting elements 12 embedded in release layer 24. Matrix polymer 14 was dissolved in the solvent by vigorous magnetic stirring of solid powder matrix polymer 14 until all of matrix polymer 14 was dissolved and the viscosity of the resulting solution increased. The concentration of matrix polymer 14 in the solution was between about 8 weight % (wt. %) and about 12 wt. %, such as about 10 wt, %. The solution was stirred for about 24 hours to about 48 hours with intermittent periods of gentle heating (between about 40° C. and about 50° C.).

Ion-conducting elements 12 embedded in release layer 24 were slot coated with the solution of matrix polymer 14 with coating speeds ranging from about 0.17 cm/s to about 0.22 cm/s (about 0.065 inches/s to about 0.085 inches/s). After each coating pass, substrate 22. including the coated ion-conducting elements 12 embedded in release layer 24 was heated for about 5 minutes at about 75° C. to remove most of the solvent from the solution including matrix polymer 14.

Figure 6:
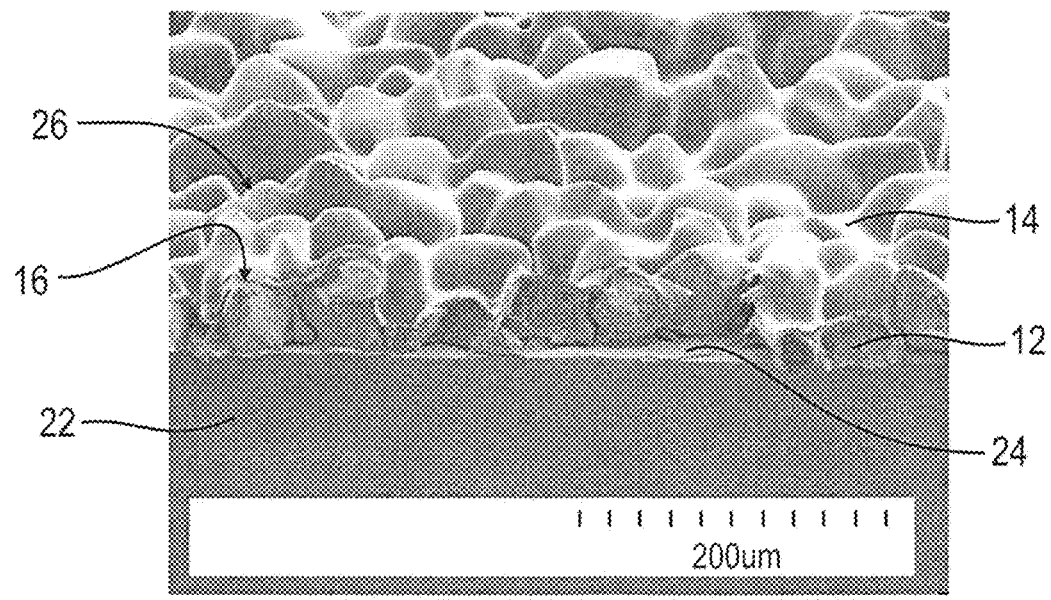
FIG. 6 is a scanning electron microscope (SEM) image after slot coating ion-conducting elements with a matrix polymer.

FIG. 6 is a scanning electron microscope (SEM) image after slot coating ion-conducting elements 12 with matrix polymer 14. Ion-conducting elements 12 were slot coated with a solution of 10 wt. % ZEON 1430 matrix polymer 14 for two coating passes at a coating speed of about 0.2 cm/s (about 0.075 inches/s). FIG. 6 suggests that matrix polymer 14 is conformal (e.g., conforms to the shape of the underlying ion-conducting elements 12 and release layer 24). This leads to deposition of matrix polymer 14 both between ion-conducting elements 12 and on first surface 16 of ion-conducting elements 12. The portion of matrix polymer 14 on first surface 16 of ion-conducting elements 12 is overburden 26.

EXAMPLE 4

Removal of Overburden of Matrix Polymer from First Surface of Ion-Conducting Elements Via Etching Overburden 26 of matrix polymer 14 was removed from first surface 16 of ion-conducting elements 12 by plasma etching using a March plasma etcher. The etching conditions included the use of oxygen plasma, a power of about 250 W, a chamber pressure of about 40 Pa (about 300 mTorr), and an oxygen flow rate of about 19 standard cubic centimeters per minute (sccm). The etching was performed for about 26 minutes. Removal of overburden 26 exposed first surface 16 of ion-conducting elements 12 while maintaining matrix polymer 14 between ion-conducting elements 12.

Figure 7:
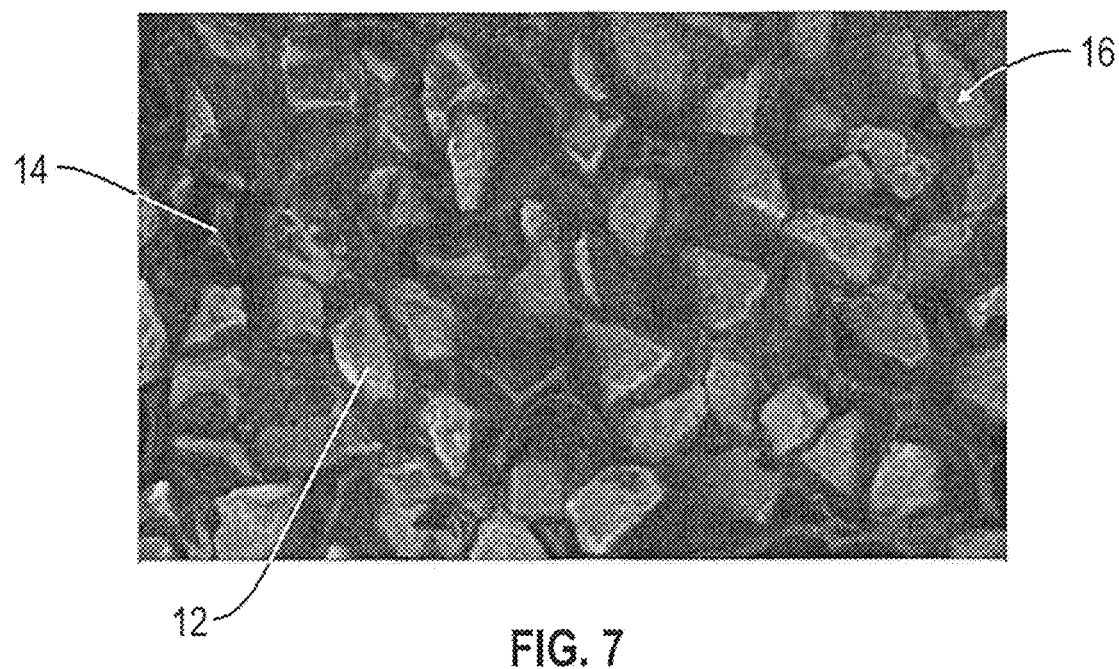
FIG. 7 is a top view SEM image of ion-conducting elements surrounded by a matrix polymer in which an overburden has been removed from a first surface of ion-conducting elements via etching.

FIG. 7 is a top view SEM image of ion-conducting elements 12 surrounded by matrix polymer 14 in which overburden 26 has been removed from first surface 16 of ion-conducting elements 12 via etching.

EXAMPLE 5

Removal of Overburden from Ion-Conducting Elements Via Polishing and Etching

In another example, overburden 26 of matrix polymer 14 was removed from first surface 16 of ion-conducting elements 12 by a combination of polishing and etching. First surface 16 of at least some of ion-conducting elements 12 was polished using Diamond Lapping Films (DLF) and a progression of grit particle sizes including grit sizes of about 6 µm, about 3 µm, about 1 µm, about 0.5 µm, and about 0.1 µm while ion-conducting elements 12 were embedded in release layer 24 on relatively rigid substrate 22. The polishing was performed for between about 20 minutes and about 25 minutes.

Because ion-conducting elements 12 were not uniform in size, shape, height h, and/or orientation in this example, the polishing was unable to remove overburden 26 from all the ion-conducting elements 12. For example, additional polishing may have resulted in more of matrix polymer 14 surrounding ion-conducting elements 12 being removed and/or some of the taller ion-conducting elements 12 being polished extensively.

Figure 8:
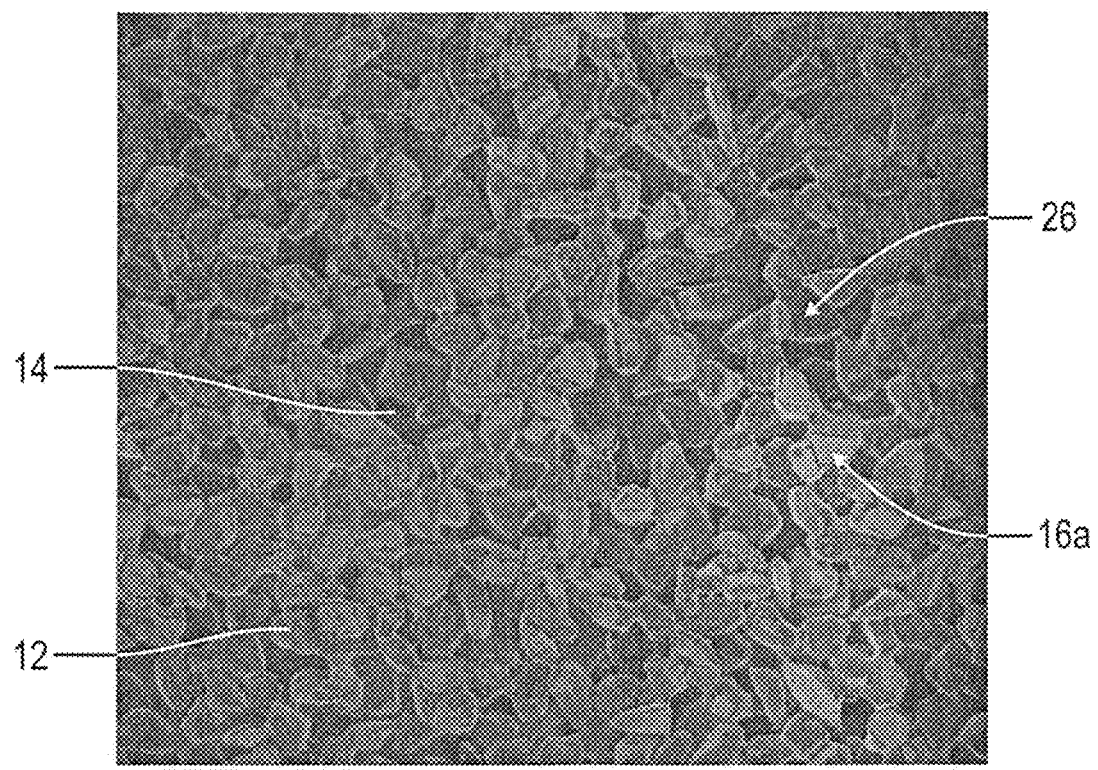
FIG. 8 is an SEM image of ion-conducting elements surrounded by a matrix polymer in which an overburden has been removed from a first surface of at least some ion-conducting elements via polishing.

FIG. 8 is an example of ion-conducting elements 12 surrounded by matrix polymer 14 in which overburden 26 has been removed from first surface 16a of at least some ion-conducting elements 12 via polishing, At least some of the taller ion-conducting elements 12 that have been polished to expose first surface 16a include a relatively planar first surface 16a due to the polishing. As seen in FIG. 8, some other ion-conducting elements 12 still have overburden 26 covering first surface 16. To remove the remaining overburden 26 from first surface 16, etching similar to that described in Example 4 was used.

Figure 9:
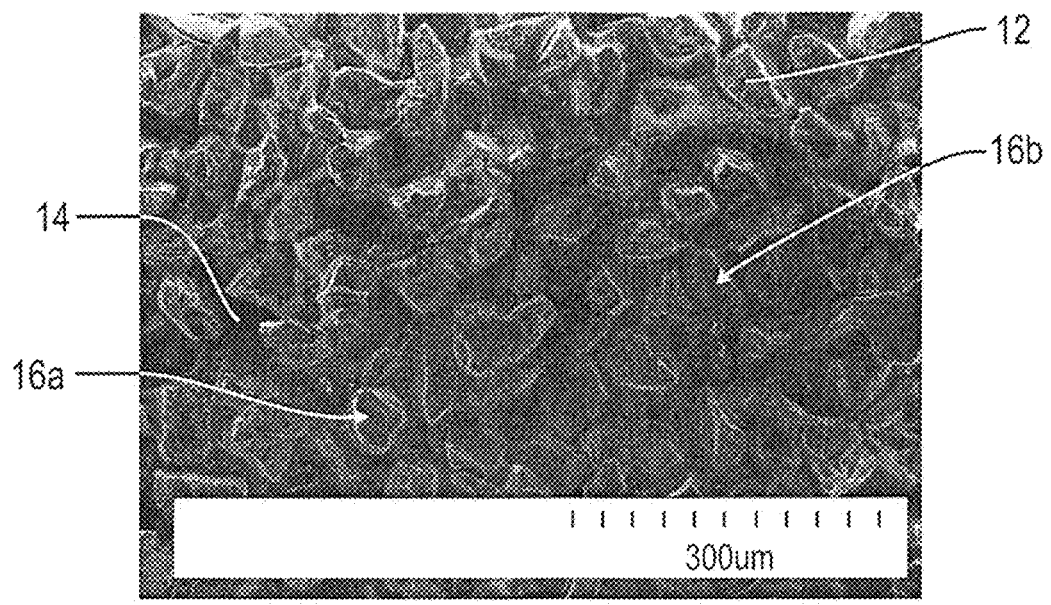
FIG. 9 is a top view SEM image of ion-conducting elements surrounded by a matrix polymer in which an overburden has been removed from a first surface of ion-conducting elements via a combination of polishing and etching.

FIG. 9 is a top view SEM image of an example of ion-conducting elements 12 surrounded by matrix polymer 14 in which overburden 26 has been removed from first surface 16 of ion-conducting elements 12 via a combination of polishing and etching. As seen in FIG. 9, some of the taller ion-conducting elements 12 include relatively planar first surfaces 16a due to the polishing, while some of the shorter ion-conducting elements 12 include first surfaces 16b of the original shape of the respective ion-conducting element 12 due to etching (e.g., overburden 26 was removed via etching such that first surface 16b was not made relatively planar by polishing).

EXAMPLE 6

Removal of Overburden from Ion-Conducting Elements Via Polishing and Etching

Ion-conducting elements 12 surrounded by matrix polymer 14 that form LICM 10 were separated from substrate 22 by treatment with a solution to dissolve and remove release layer 24. Release layer 24 was treated with a 0.26 N tetramethylammonium hydroxide (TMAH) developer at room temperature for about 4 hours to chemically react and dissolve release layer 24.

Figure 10:
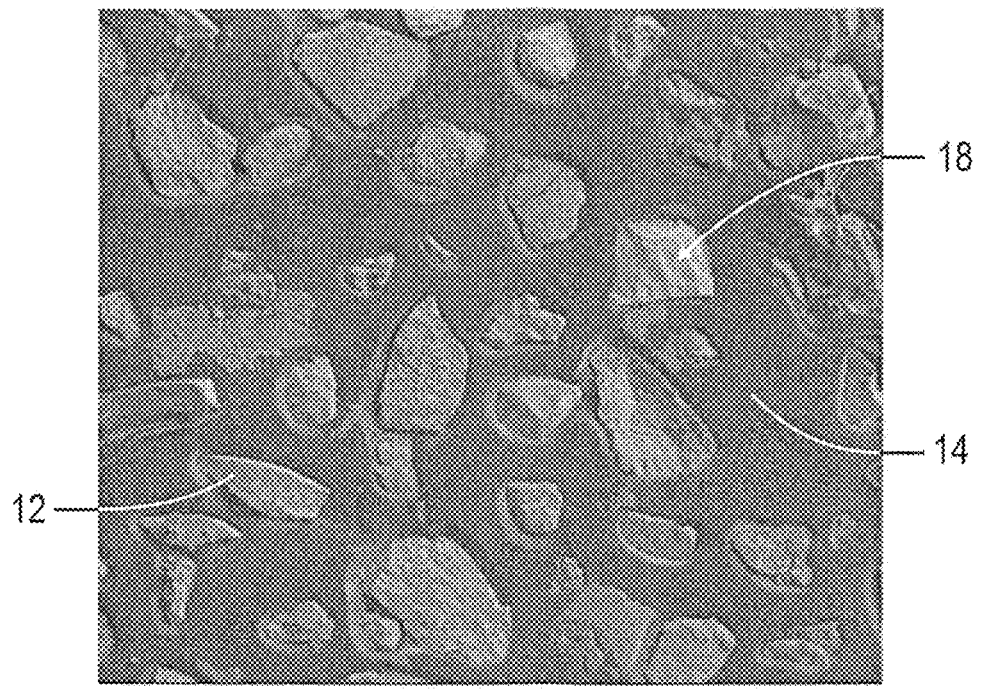
FIG. 10 is a SEM image of a second surface of ion-conducting elements surrounded by a matrix polymer previously embedded in release layer.

FIG. 10 is an SEM image of second surface 18 of ion-conducting elements 12 surrounded by matrix polymer 14 previously embedded in release layer 24. FIG. 10 shows second surface 18 of ion-conducting elements 12 after the chemical dissolution of release layer 24 and separation of LICM 10 including ion-conducting elements 12 surrounded by matrix polymer 14 from substrate 22.

Figure 11:
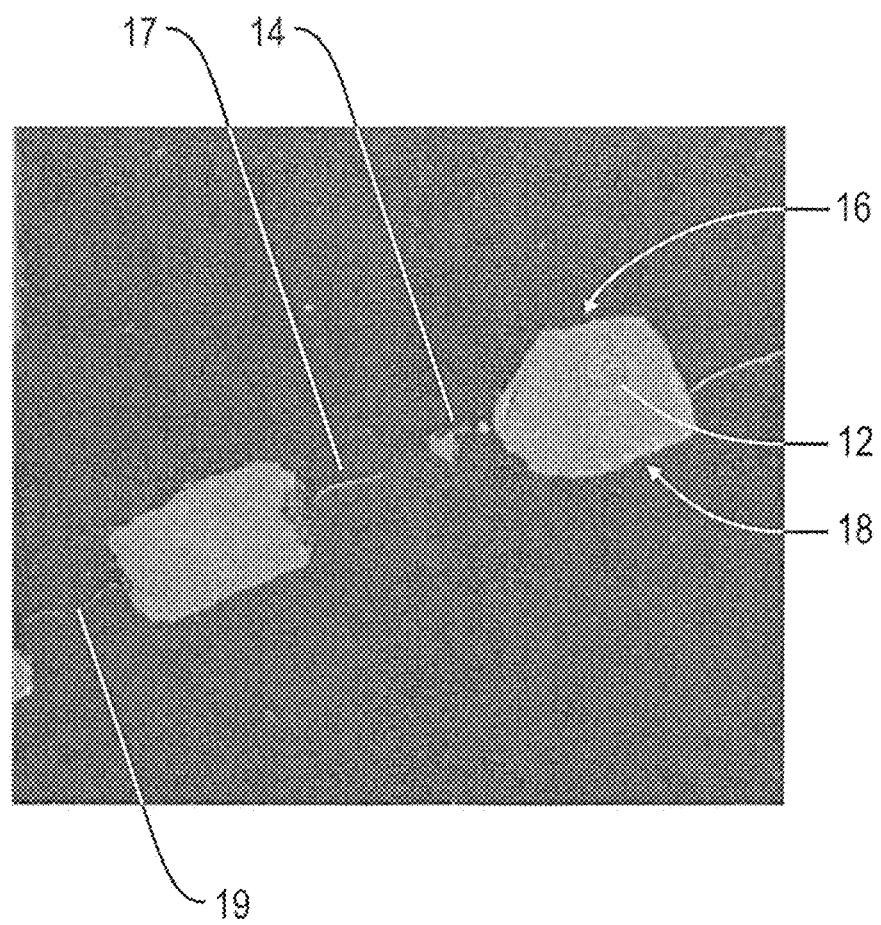
FIG. 11 is a cross-sectional transmission electron microscope (TEM) image of a. lithium ion-conducting membrane including ion-conducting elements and a matrix polymer.

FIG. 11 is a cross-sectional transmission electron microscope (TEM) image of LICM 10 including ion-conducting elements 12 and matrix polymer 14. As seen in FIG. 11, LICM 10 of FIG. 11 is similar to that of FIG. 1. For example, ion-conducting elements 12 may span matrix polymer 14 from first major surface 17 of matrix polymer 14 to second major surface 19 of matrix polymer 14 such that both first surface 16 and second surface 18 of ion-conducting elements 12 are exposed.

EXAMPLE 7

Electrical Properties of LICMS Formed Using Release Layer Technique Described Herein Two types of electrical measurements were performed on LICMs prepared by the techniques described herein. The first experiment included lithium plate strip measurements in which a coin cell with a symmetrical configuration of lithium, an electrolyte, a Celgard separator, the LICM: (formed using the techniques described herein), a Celgard separator, an electrolyte, and lithium was repeatedly cycled in a series of plate-strip cycles. The current was kept constant at about 200 uA/cm$^2$. The results were compared to those obtained using a LICM formed using an adhesive tape method.

Figure 12A:
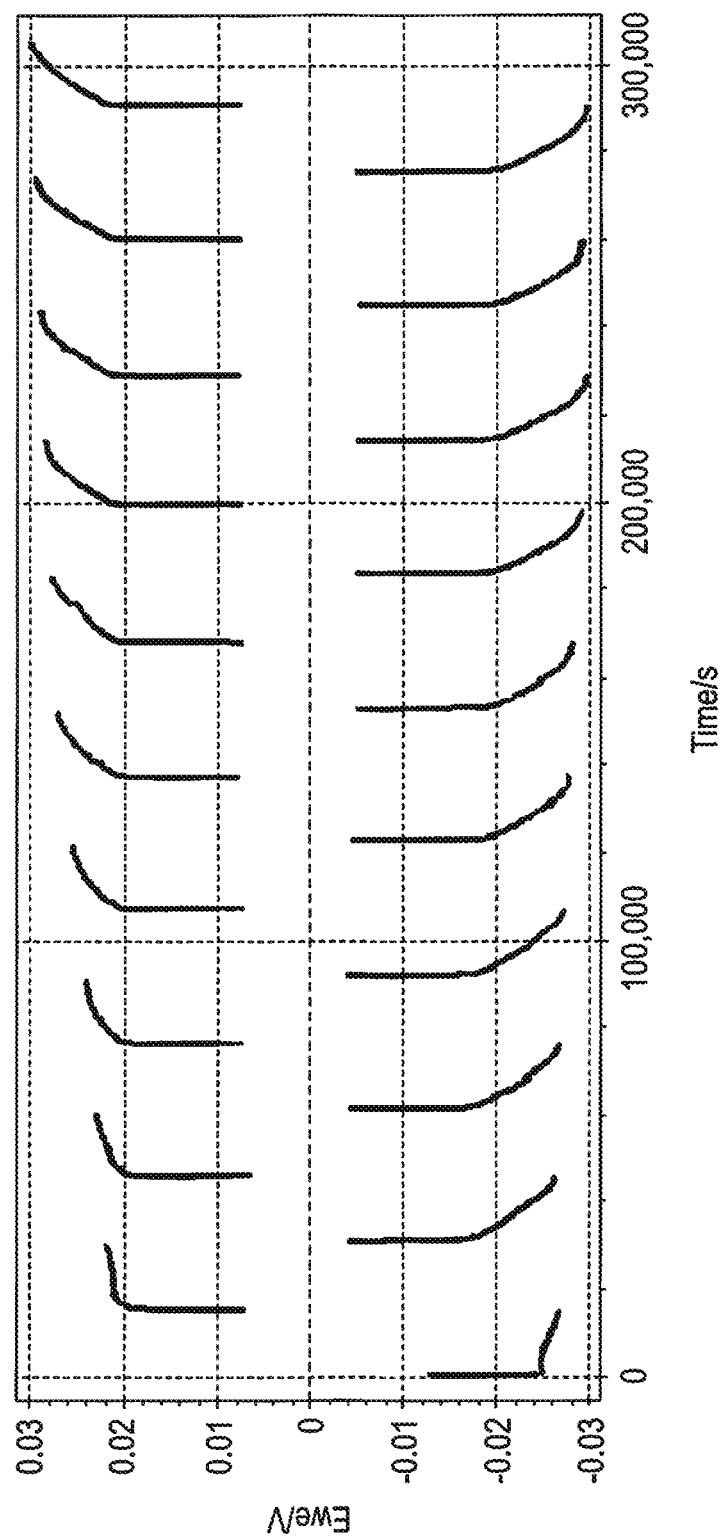
FIG. 12A is a graph of voltage vs. time illustrating results of lithium plate strip measurements for a lithium ion-conducting membrane formed using the technique described herein.
Figure 12B:
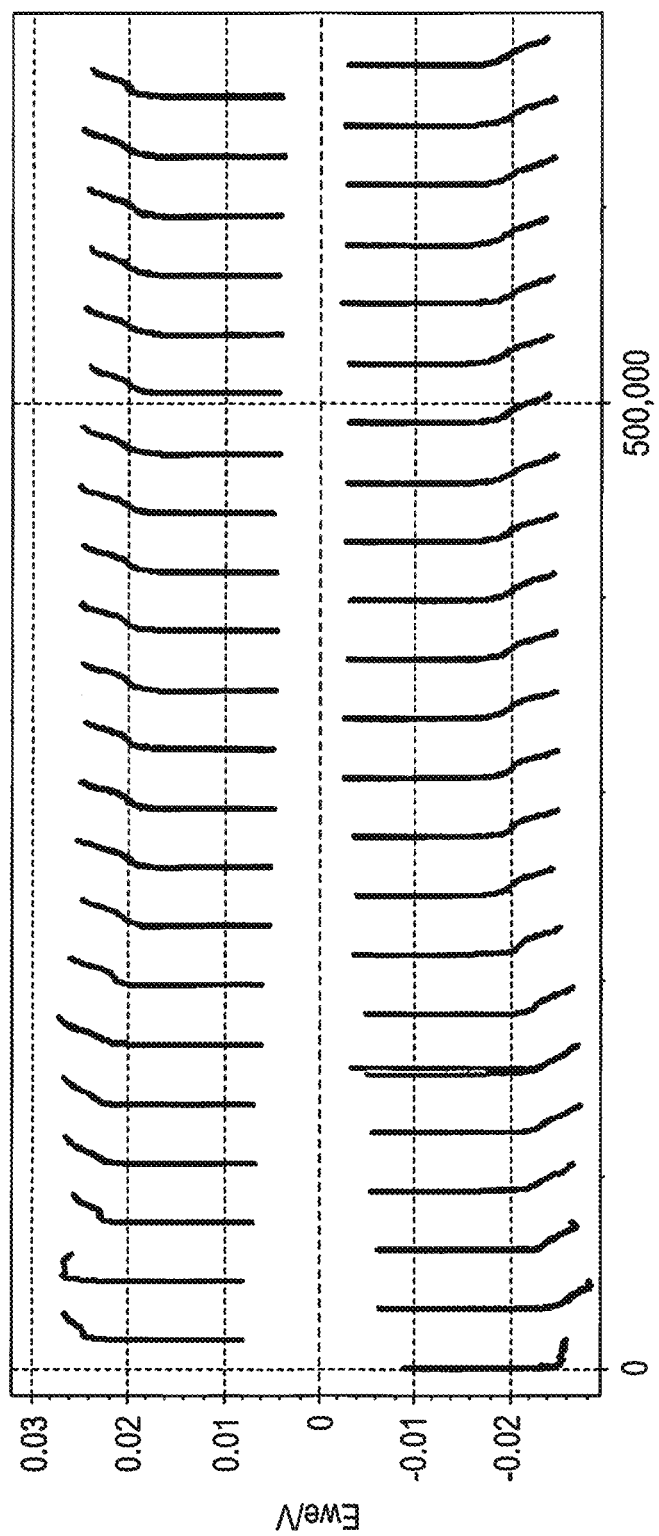
FIG. 12B is a graph of voltage vs. time illustrating results of lithium plate strip measurements for a lithium ion-conducting membrane formed using an adhesive tape method.

FIG. 12A is a graph illustrating the results of the lithium plate strip measurements for the LICM formed using the technique described herein. FIG. 12.B is a graph illustrating the results of the lithium plate strip measurements for the LICM formed using the adhesive tape method. As seen in FIGS. 12A and 12B, the results are similar, indicating that the release layer technique described herein produces LICMs with cycling properties similar to, or even better than, LICMs formed using the adhesive tape method. For example, FIG. 12A illustrates that many cycles can be completed without a large increase in voltage or evidence of dendrite formation.

The second experiments included impedance spectroscopy measurements performed on the LICM formed using the release layer technique described herein. The impedance spectroscopy measurements were performed using lithium electrodes and a standard lithium electrolyte (1 M LiPF$_6$ in ethylene carbonate/dimethyl carbonate (EC/DMC)). Fifty-one small signal (V=10 mV) AC impedance measurements were performed on a VMP3 impedance analyzer available from BioLogic Science Instruments, Seyssinet-Pariset, France, using sinusoidal AC waveforms. The frequency of the sinusoidal AC waveforms ranged from about 100 mHz to about 1 MHz. The results were compared to those obtained using a LICM formed using an adhesive tape method.

Figure 13A:
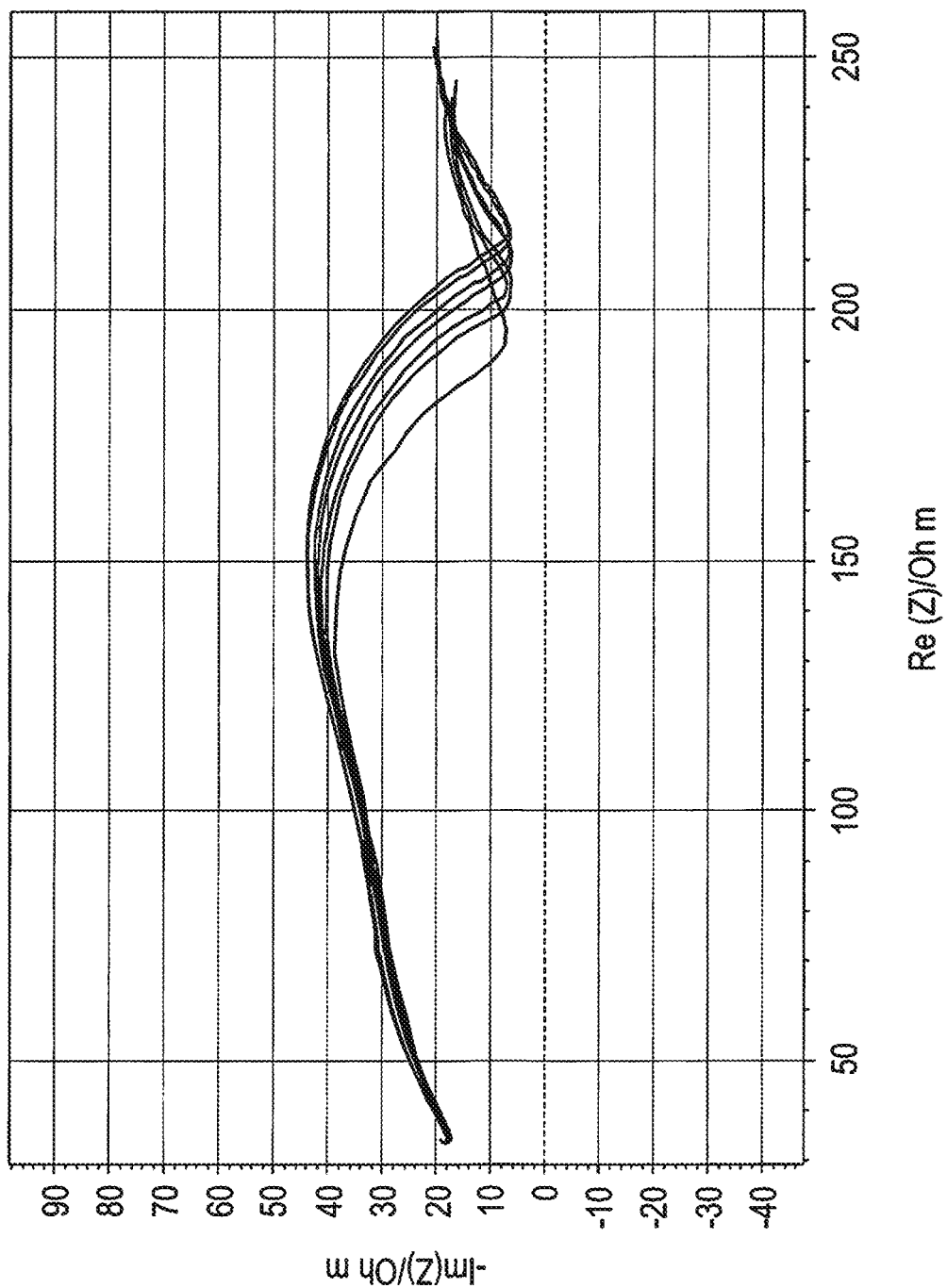
FIGS. 13A and 13B are graphs of the imaginary part of impedance vs. the real part of impedance illustrating results of impedance spectroscopy measurements for a lithium ion-conducting membrane formed using the technique described herein.
Figure 13B:
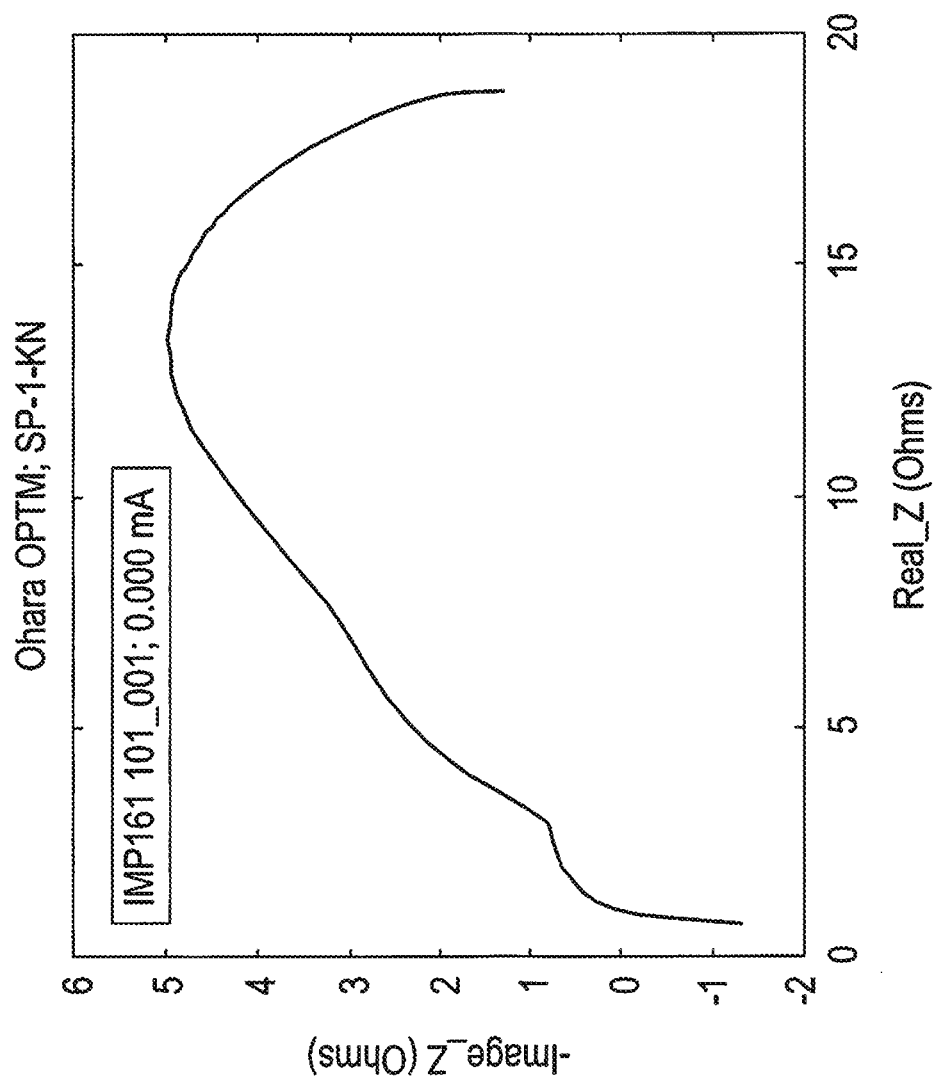
Figure 13C:
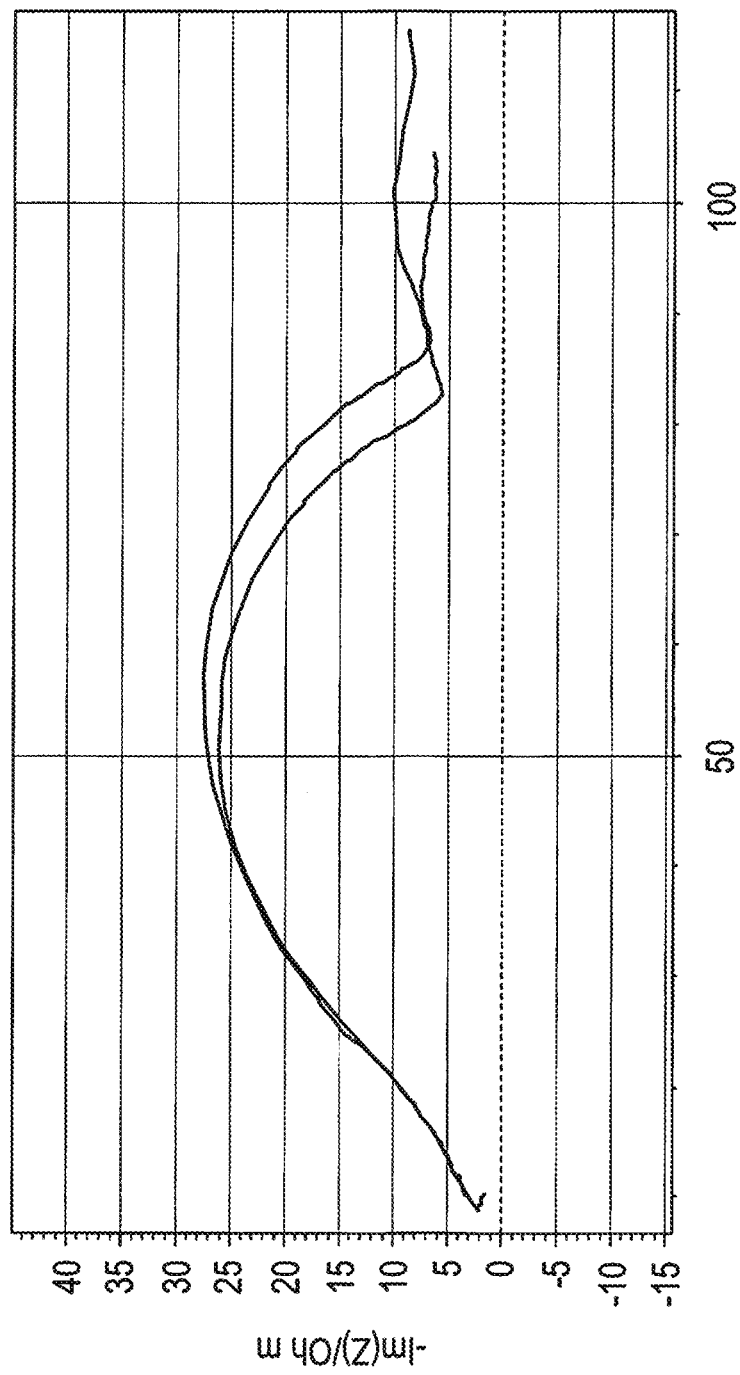
FIGS. 13C and 13D are graphs illustrating results of lithium plate strip measurements for a lithium ion-conducting membrane formed using the adhesive tape method.
Figure 13D:
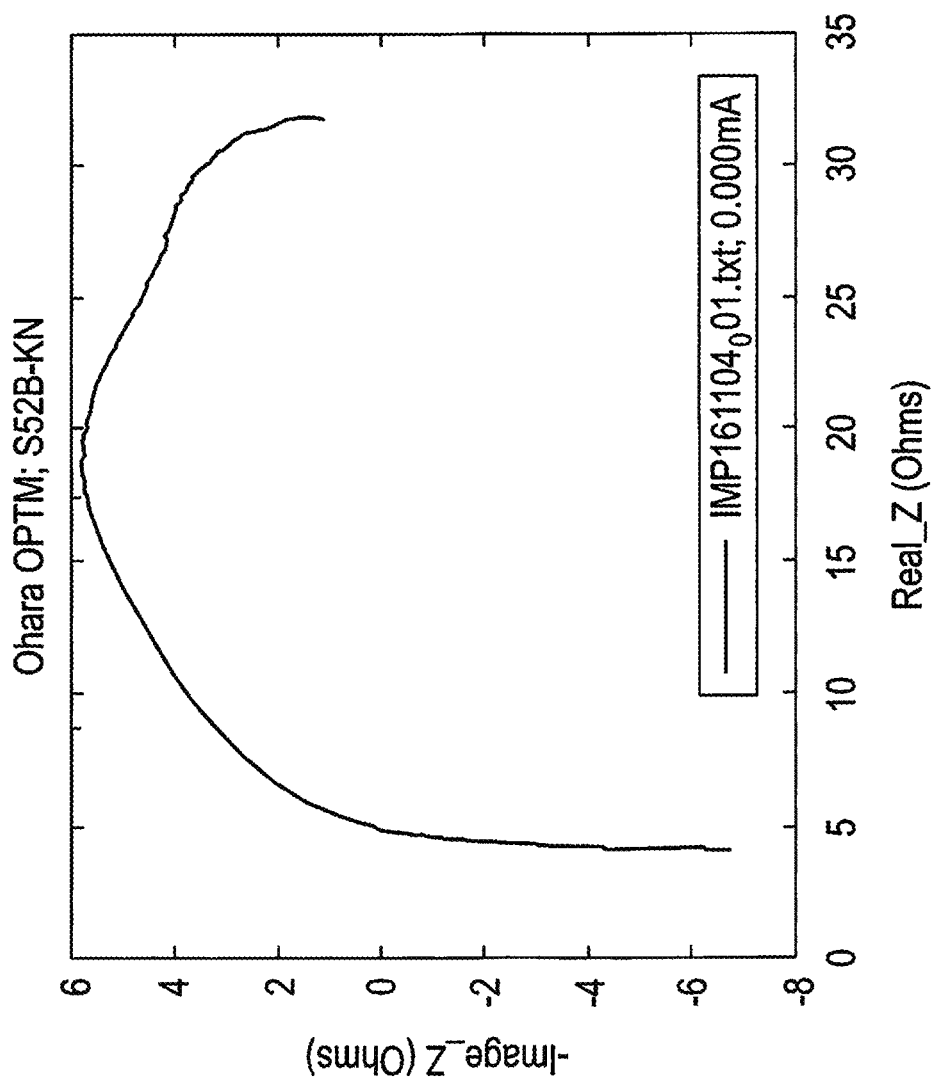

FIGS. 13A and 13B are graphs illustrating the results of the impedance spectroscopy measurements for the LICM formed using the technique described herein. FIGS. 13C and 13D are graphs illustrating the results of the lithium plate strip measurements for the LICM formed using the adhesive tape method. As seen in FIGS. 13A-13D, the results are similar for both the LICM formed using the technique of the present disclosure and the adhesive tape method, indicating that the release layer technique described herein produces LICMs with impedance properties similar to, or even better than, LICMs formed using the adhesive tape method. For example, the low impedance values measured at high frequencies have been identified previously as resistances associated with lithium ion conductivity within ion-conducting elements 12. Moreover, the higher impedance lobes, particularly those that shift with repeated scanning, have been associated with the formation of solid electrolyte interface (SEI) layers on the lithium metal. The presence of these trends in measurements from both the LICM formed using the release layer technique described herein and the adhesive tape method indicate that the electrical properties of the LICMs formed by each process are indeed very similar.

Various examples have been described. These and other examples are within the scope of the following claims.

We claim:

1. An article comprising:
   a substrate;
   a release layer on the substrate, wherein the release layer is non-adhesive and comprises a polymeric compound selected from the group consisting of poly(dimethyl glutarimide) (PMGI), poly(acrylic acid) (PAA), poly (methacrylic acid) (PMAA), poly(vinyl alcohol) (PVA), poly(vinyl acetate) (PVAc), or poly(ethylene amine) (PEI), and combinations thereof;
   a plurality of ion-conducting elements embedded in the release layer, wherein a first surface of at least a portion of the ion-conducting elements extends above the release layer; and
   a matrix polymer on the release layer, wherein the matrix polymer surrounds at least a portion of the ion-conducting elements, and wherein the matrix polymer is selected from the group consisting of a ring opening metathesis polymer (ROMP), a hydrogenated cyclo-olefin polymer (COP), a cyclo-olefin copolymer (COC), and combinations thereof.

2. The article of claim 1, wherein the substrate is selected from the group consisting of glass, quartz, silicon, nitride, polyamide, and combinations thereof.

3. The article of claim 1, wherein the release layer has a thickness of greater than about 1 μm and less than about 10 μm.

4. The article of claim 1, wherein the ion-conducting elements are adhered to the release layer.

5. The article of claim 1, wherein the ion-conducting elements are selected from the group consisting of a polymer-ceramic composite, a non-oxide inorganic material, a perovskite-type oxide, a garnet-type oxide, a Li$_3$PO$_4$ oxide, a NASICON-type material, a LISICON-type material, a single crystal membrane, lithium aluminum titanium phosphate (LATP), lithium aluminum germanium phosphate (LAGP), lithium aluminum tantalum titanium phosphate (LATTP), and combinations thereof.

6. The article of claim 1, wherein a portion of the ion-conducting elements is an exposed first surface uncovered by the matrix polymer.

7. The article of claim 6, wherein the first surface and an opposed second surface of each ion-conducting element comprise at least about 50% of the surface area of the corresponding ion-conducting element.

8. A method, comprising:
   anchoring ion-conducting particles in a release layer, wherein the release layer is polymeric, non-adhesive, and supported on a substrate;
   at least partially curing the release layer;
   applying a polymeric matrix on the release layer and the ion-conducting particles;
   removing overburden of the polymeric matrix, thereby exposing an upper surface of at least some of the ion conducting particles; and
   removing the release layer, thereby:
   (i) exposing a bottom surface of the ion-conducting particles, the bottom surface being opposite to the upper surface, and
   (ii) separating an ion-conducting membrane from the substrate, wherein the membrane comprises an arrangement of ion conducting particles embedded in a carrier layer of the polymeric matrix, and wherein the exposed upper and lower surfaces of the ion conducting particles represent at least 50% of the total particle surface area.

9. The method of claim 8, wherein the release layer has a thickness of greater than about 1 μm and less than about 10 μm.

10. The method of claim 8, wherein the release layer comprises poly(dimethyl glutarimide) (PMGI).

11. The method of claim 8, where the overburden is removed by polishing for a time sufficient to produce a nominally flat upper surface on at least a portion of the ion conducting particles in the membrane.

* * * * *